(12) United States Patent
Park et al.

(10) Patent No.: US 12,234,941 B2
(45) Date of Patent: Feb. 25, 2025

(54) DISPLAY DEVICE

(71) Applicant: LG ELECTRONICS INC., Seoul (KR)

(72) Inventors: Daegun Park, Seoul (KR); Donghee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 17/928,182

(22) PCT Filed: Jun. 10, 2020

(86) PCT No.: PCT/KR2020/007542
§ 371 (c)(1),
(2) Date: Nov. 28, 2022

(87) PCT Pub. No.: WO2021/241793
PCT Pub. Date: Dec. 2, 2021

(65) Prior Publication Data
US 2023/0243460 A1    Aug. 3, 2023

(30) Foreign Application Priority Data
May 26, 2020 (KR) .................. 10-2020-0062767

(51) Int. Cl.
*F16M 11/12* (2006.01)
*G06F 3/02* (2006.01)
(Continued)

(52) U.S. Cl.
CPC ......... *F16M 11/125* (2013.01); *G06F 3/0227* (2013.01); *F16M 2200/024* (2013.01);
(Continued)

(58) Field of Classification Search
CPC ................ F16M 11/10; F16M 11/125; F16M 2200/024; G06F 3/0227; G06F 2200/1637;
(Continued)

(56) References Cited

U.S. PATENT DOCUMENTS

2007/0153137 A1* 7/2007 Hsu .................. G06F 1/1601
348/790
2008/0029668 A1* 2/2008 Tsuo .................. F16M 11/105
248/274.1
(Continued)

FOREIGN PATENT DOCUMENTS

JP          4344385 B2    10/2009
JP       2013-235084 A    11/2013
(Continued)

*Primary Examiner* — Tan Le
(74) *Attorney, Agent, or Firm* — Birch, Stewart, Kolasch & Birch, LLP

(57) ABSTRACT

A display device according to an embodiment of the present disclosure may include a base, a stand bar extending upward from the base in a vertical direction, and a head having a display on a front side and having a pair of long sides and a pair of short sides on a peripheral portion, the head being pivotable between a landscape mode in which the long side is in a horizontal state and a portrait mode in which the long side is in a vertical state, wherein the head may include a processor configured to determine whether a rotation unlock condition of the head is satisfied, and when the rotation unlock condition of the head is satisfied, rotate the head about a rotation axis as external force is applied to the head.

11 Claims, 22 Drawing Sheets

(51) Int. Cl.
   *G06F 1/16* (2006.01)
   *G06F 3/16* (2006.01)
   *H04R 5/04* (2006.01)

(52) U.S. Cl.
   CPC .................. *G06F 1/16* (2013.01); *G06F 3/16* (2013.01); *G06F 2200/1637* (2013.01); *G06F 2200/1638* (2013.01); *H04R 5/04* (2013.01)

(58) Field of Classification Search
   CPC .... G06F 3/16; G06F 1/16; H04R 5/04; H05K 5/03; H05K 5/02
   See application file for complete search history.

(56) References Cited

U.S. PATENT DOCUMENTS

| | | |
|---|---|---|
| 2008/0062099 A1 | 3/2008 | Oshima |
| 2017/0051866 A1 | 2/2017 | Chen et al. |
| 2018/0080598 A1 | 3/2018 | Ligtenberg et al. |
| 2019/0069422 A1* | 2/2019 | Choi .................... F16M 11/105 |

FOREIGN PATENT DOCUMENTS

| | | | |
|---|---|---|---|
| KR | 10-0869563 B1 | 11/2008 | |
| KR | 102308450 B1 * | 3/2020 | |
| WO | WO-2006030487 A1 * | 3/2006 | ........... F16M 11/105 |

* cited by examiner

DISPLAY DEVICE

CROSS REFERENCE TO RELATED APPLICATIONS

This application is the National Phase of PCT International Application No. PCT/KR2020/007542, filed on Jun. 10, 2020, which claims priority under 35 U.S.C. § 119(a) to Patent Application No. 10-2020-0062767, filed in the Republic of Korea on May 26, 2020, all of which are hereby expressly incorporated by reference into the present application.

TECHNICAL FIELD

The present disclosure relates to a display device, and more particularly, to a display device in which a head with a display is rotatable.

BACKGROUND ART

A display device is a device that displays image information received from the outside or image information stored therein. Examples of a representative display device may include a television, a monitor, a laptop, and a smartphone.

However, a conventional mobile display device, such as a smartphone, is limited in size for portability. In contrast, a relatively large display device, such as a TV, requires a large installation space and is inconvenient to move.

DISCLOSURE OF INVENTION

Technical Problem

The present disclosure aims to provide a display device in which a head is naturally rotatable.

The present disclosure aims to guide rotation of a part with a low risk of damage to a device.

The present disclosure aims to prevent unnecessary shaking of a device by locking rotation of a head.

Technical Solution

A display device according to an embodiment of the present disclosure may include a base, a stand bar extending upward from the base in a vertical direction, and a head having a display on a front side and having a pair of long sides and a pair of short sides on a peripheral portion, the head being pivotable between a landscape mode in which the long side is in a horizontal state and a portrait mode in which the long side is in a vertical state, wherein the head may include a processor configured to determine whether a rotation unlock condition of the head is satisfied, and when the rotation unlock condition of the head is satisfied, rotate the head about a rotation axis as external force is applied to the head.

The processor may be configured to determine that the rotation unlock condition of the head is satisfied when a touch input is sensed within a predetermined area of a display area of the display.

When the display is in the landscape mode, the predetermined area may be far away from the stand bar and is located at an upper right end of the display, and when the display is in the portrait mode, the predetermined area may be far away from the stand bar and is located at a lower right end of the display.

The processor may be configured to determine that the rotation unlock condition of the head is satisfied when a user's touch is sensed in a predetermined part of the peripheral portion.

When the display is in the landscape mode, the predetermined part may be far away from the stand bar and is located at an upper right end of the display, and when the display is in the portrait mode, the predetermined part may be far away from the stand bar and is located at a lower right end of the display.

The processor may be configured to determine that the rotation unlock condition of the head is satisfied when a touch input is sensed within a predetermined area of a display area of the display and a user's touch is sensed in a predetermined part of the peripheral portion.

The processor may be configured to, when the rotation unlock condition of the head is satisfied, display guide information indicating that rotation of the head is possible on the display.

The processor may be configured to, when the rotation unlock condition of the head is satisfied, display guide information indicating to hold and rotate a specific part of the head on the display.

When the stand bar or the base is tilted by a predetermined angle, the processor may be configured to maintain a rotation lock state of the head even when the rotation unlock condition of the head is satisfied.

The stand bar or the base may include an angle sensor or an acceleration sensor configured to measure a tilt angle.

The display device may further include a through groove extending along the peripheral portion of the head, a connecting bar disposed inside the head and connected to the stand bar through the through groove, a latch protruding inward from an inner surface of the head and supported by the connecting bar, and an elastic member configured to press the latch in a protruding direction.

The display device may further include a motor configured to press the latch when the rotation unlock condition of the head is satisfied.

Advantageous Effects

According to an embodiment of the present disclosure, a head is rotated naturally, thereby significantly reducing the risk of damage to a device.

According to an embodiment of the present disclosure, rotation of a head may be guided to provide the convenience of allowing a user to easily rotate the head.

According to an embodiment of the present disclosure, when there is no intention to rotate a head, unnecessary shaking of a device may be prevented by locking rotation of the head.

BEST MODE FOR CARRYING OUT THE INVENTION

Hereinafter, specific embodiments of the present disclosure will be described in detail with reference to the drawings.

Hereinafter, an expression "an element is "coupled" or "connected" to another element may means that the two elements are directly coupled or connected to each other, or may mean that a third element is present between the two elements and the two elements are coupled or connected to each other by the third element. On the other hand, when it is described that one element is "directly coupled" or "directly connected" to another element, it may be understood that a third element is not present between the two elements.

Figure 1:
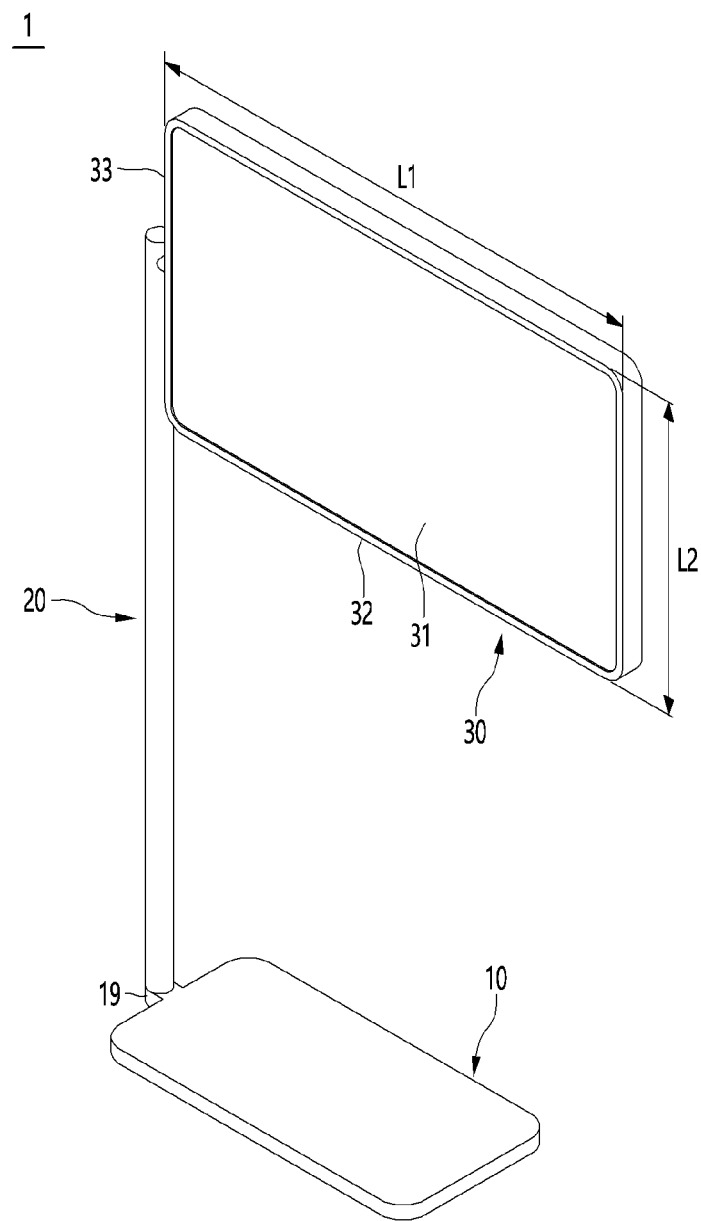
FIG. 1 is a front view of a display device according to an embodiment of the present disclosure.
Figure 2:
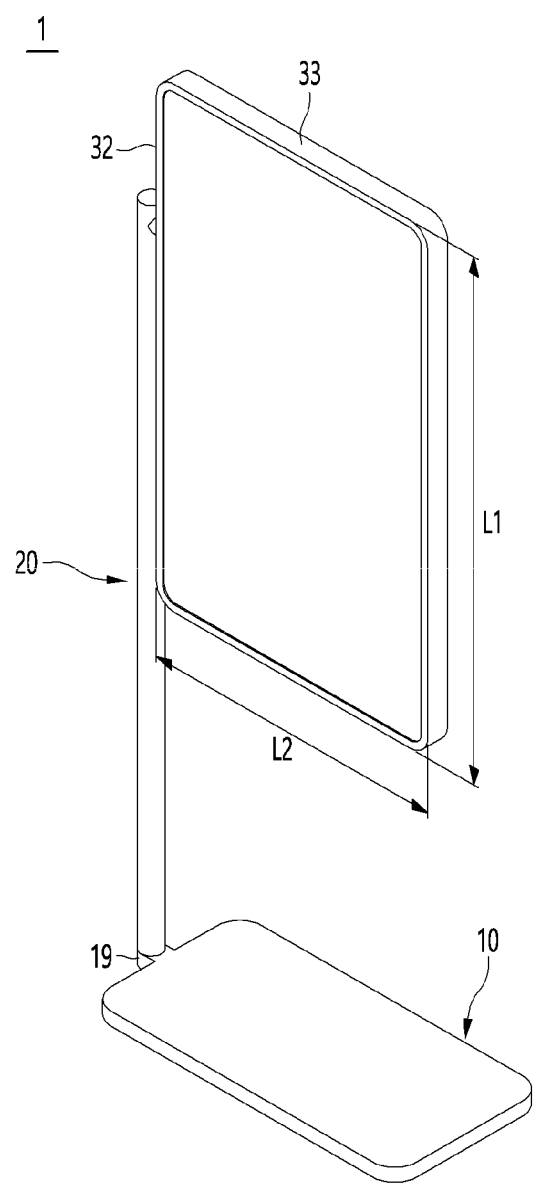
FIG. 2 is a front view of a state in which a head shown in FIG. 1 is pivoted in a portrait mode.
Figure 3:
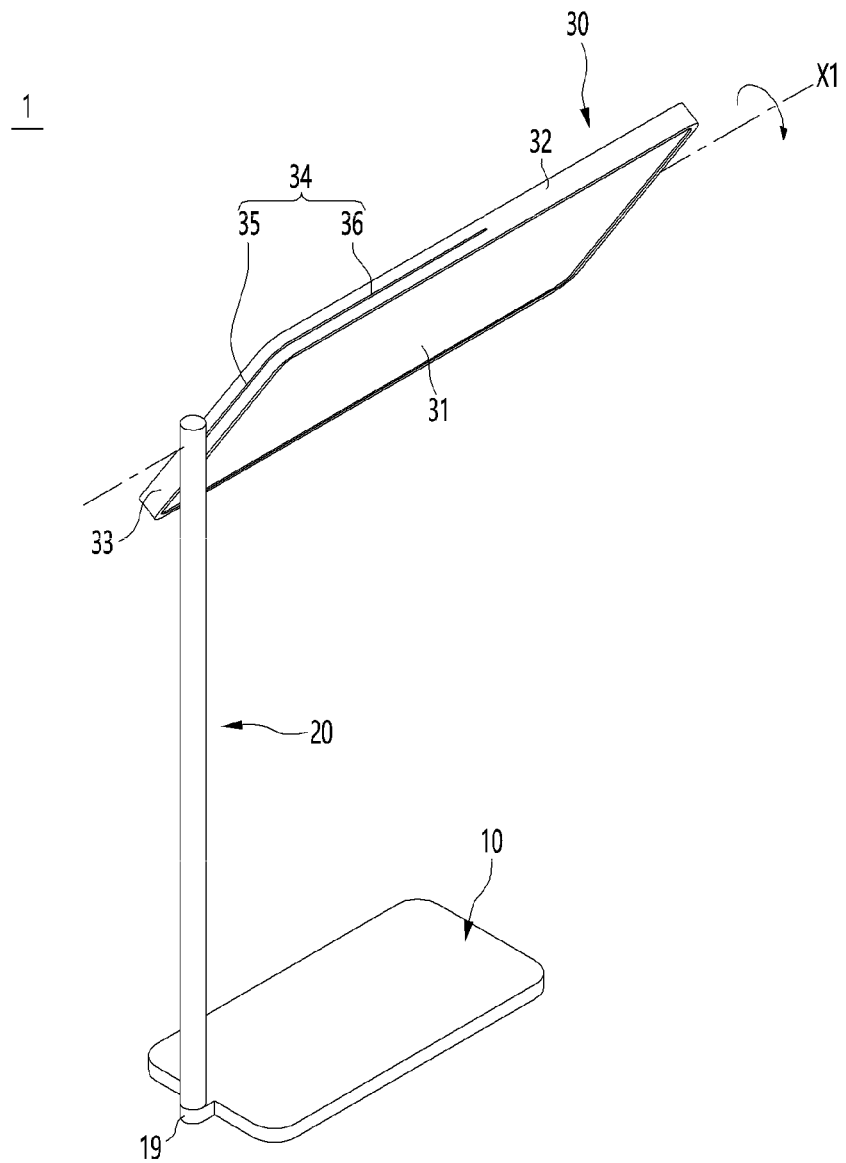
FIG. 3 is a view showing a state in which the head is tilted, according to an embodiment of the present disclosure.
Figure 4:
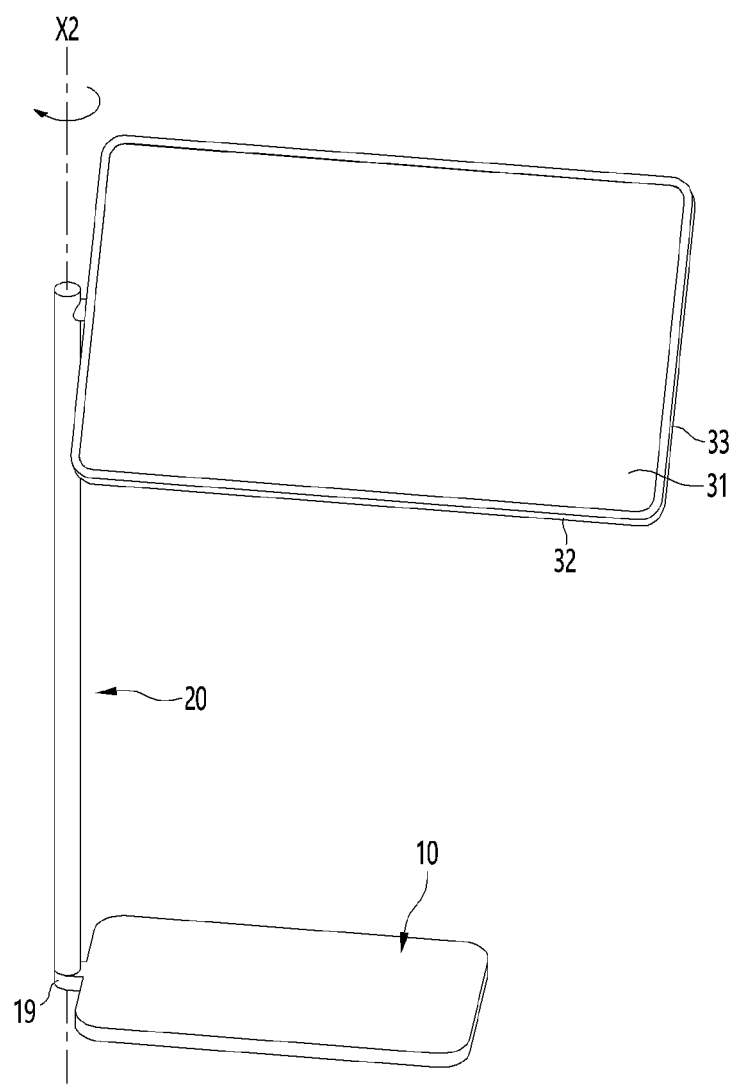
FIG. 4 is a view showing a state in which the head is swiveled, according to an embodiment of the present disclosure.

FIG. 1 is a front view of a display device according to an embodiment of the present disclosure, FIG. 2 is a front view of a state in which a head shown in FIG. 1 is pivoted in a portrait mode, FIG. 3 is a view showing a state in which the head is tilted, according to an embodiment of the present disclosure, and FIG. 4 is a view showing a state in which the head is swiveled, according to an embodiment of the present disclosure.

A display device 1 according to an embodiment of the present disclosure may include a base 10, a stand bar 20, and a head 30.

The base 10 may support the display device 1 with respect to the floor surface.

The stand bar 20 may extend upward from the base 10 in a vertical direction. The stand bar 20 may connect the base 10 to the head 30.

In more detail, the lower end of the stand bar 20 may be connected to the peripheral portion of the base 10. A stand bar connecting part 19 protruding outward may be formed in the peripheral portion of the base 10, and the lower end of the stand bar 20 may be connected to the stand bar connecting part 19.

The head 30 may be spaced apart from the upper side of the base 10. A display 31 may be provided on the front surface of the head 30. A video or an image may be displayed on the display 31. In addition, the display 31 may include a touch screen.

The peripheral portions 32 and 33 of the head 30 may include a pair of long sides 32 and a pair of short sides 33. The longitudinal direction of the long side 32 may be orthogonal to the longitudinal direction of the short side 33. A length L1 of the long side 32 may be longer than a length L2 of the short side 33.

The head 30 may be pivoted between a landscape mode (see FIG. 1) in which the long side 32 is horizontal and the short side 33 is vertical and a portrait mode (see FIG. 2) in which the long side 32 is vertical and the short side 33 is horizontal.

The head 30 may be located on the same side as the base 10 with respect to the stand bar 20. That is, the head 30 may overlap the base 10 in the vertical direction. Accordingly, since the center of gravity of the display device 1 does not deviate from the upper side of the base 10, the display device 1 may be stably supported without being overturned.

The horizontal length of the base 10 may be shorter than the length L1 of the long side 32 of the head 30 and longer than the length L2 of the short side 33 of the head 30. Accordingly, the head 30 in the landscape mode may protrude laterally than the base 10. The base 10 may protrude laterally than the head 30 in the portrait mode.

The stand bar 20 may extend sufficiently long. The vertical length of the stand bar 20 may be longer than the length L1 of the long side 32 of the head 30. The vertical length of the stand bar 20 may be longer than the sum (L1+L2) of the length L1 of the long side 32 of the head 30 and the length L2 of the short side 33 of the head 30.

The stand bar 20 may be connected to the peripheral portions 32 and 33 of the head 30. In more detail, the upper portion of the stand bar 20 may be connected to the peripheral portions 32 and 33 of the head 30.

Since the stand bar 20 is connected to the peripheral portions 32 and 33 rather than the rear surface of the head 30, the appearance of the display device 1 is improved in design, and the back surface of the head 30 can be used for other purposes (for example, a mirror).

The upper portion of the stand bar 20 may face the peripheral portions 32 and 33 of the head 30 in the horizontal direction. In more detail, in the landscape mode, the upper portion of the stand bar 20 may face the short side 33 of the head 30 in the horizontal direction. In the portrait mode, the upper portion of the stand bar 20 may face the long side 32 of the head 30 in the horizontal direction.

A through groove 34 may be formed in the peripheral portions 32 and 33 of the head 30. The through groove 34 may extend along the peripheral portions 32 and 33 of the head 30. The head 30 may be connected to the stand bar 20 through the through groove 34

In more detail, a connecting pin 22 (see FIG. 10) protruding toward the through groove 34 may be formed in the stand bar 20. The connecting pin 22 may be connected through the through groove 34 to a connecting bar 40 to be described below.

The through groove 34 may include a first groove 35 passing through the short side 33 and a second groove 36 passing through the long side 32. The first groove 35 may extend along the short side 33, and the second groove 36 may extend along the long side 32. The first groove 35 and the second groove 36 may be connected to each other. The first groove 35 and the second groove 36 may be connected to each other at the corners of the peripheral portions 32 and 33.

The first groove 35 may be formed in one of the pair of short sides 33. The length of the first groove 35 may be shorter than the length of the short side 33, and may be at least half the length of the short side 33.

The second groove 36 may be formed in one of the pair of long sides 32. The length of the second groove 36 may be shorter than the length of the long side 32, and may be at least half the length of the long side 32.

Accordingly, when the head 30 is pivoted, the connecting pin 22 of the stand bar 20 may maintain a state of passing through the through groove 34. In the landscape mode, the stand bar 20 may be connected to the head 30 through the first groove 35. In the portrait mode, the stand bar 20 may be connected to the head 30 through the second groove 36.

On the other hand, as shown in FIG. 3, the head 30 may rotate about a horizontal axis x1 with respect to the stand bar 20. The horizontal axis x1 may correspond to the connecting pin 22 (see FIG. 10) of the stand bar 20. That is, the head 30 enables a tilt operation of tilting at a predetermined angle with respect to the horizontal axis x1.

The tilt of the head 30 may be performed regardless of the pivot of the head 30. That is, the head 30 can be tilted even in the landscape mode and can be tilted even in the portrait mode.

In addition, as shown in FIG. 4, the head 30 may rotate about a vertical axis x2 with respect to the base 10 together with the stand bar 20. In more detail, the lower end of the stand bar 20 may be rotatably connected to the stand bar connecting part 19 of the base 10. Accordingly, the head 30 enables a swivel operation in which the direction is changed at a predetermined angle with respect to the vertical axis x2.

The swivel operation of the head 30 may be performed regardless of the pivot and tilt of the head 30. That is, the head 30 can be swiveled even in the landscape mode, can be swiveled in the portrait mode, and can be swiveled even in a state of being tilted at a predetermined angle.

Figure 5:
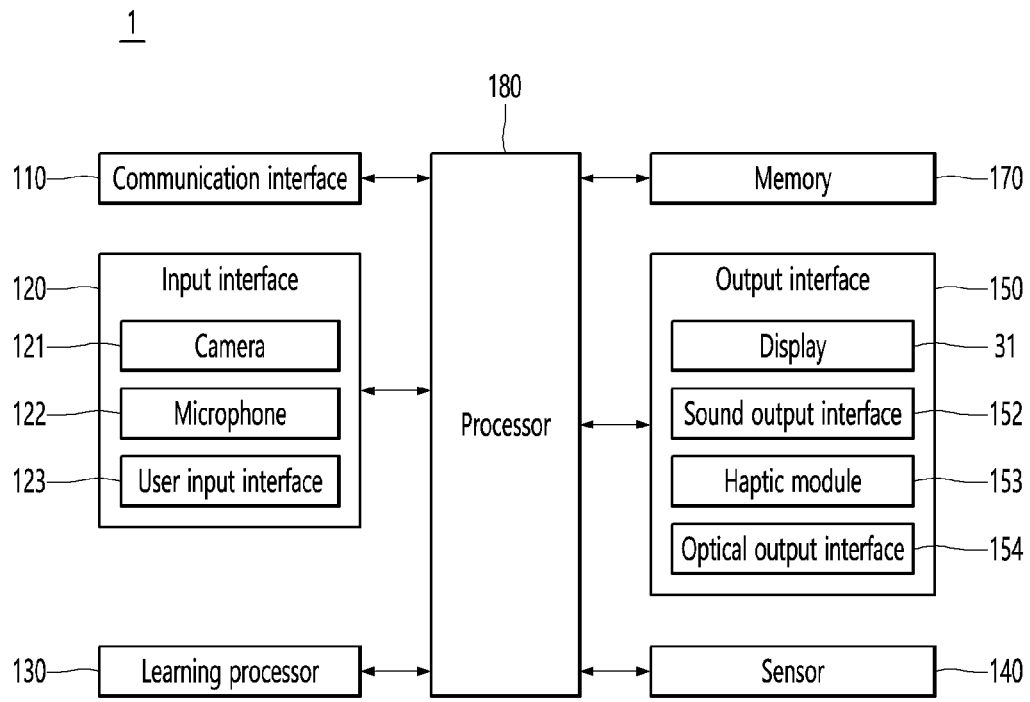
FIG. 5 is a block diagram for describing elements of the display device according to an embodiment of the present disclosure.

FIG. 5 is a block diagram for describing elements of the display device according to an embodiment of the present disclosure.

In particular, the elements of FIG. 5 may be provided in the head 30 of FIG. 1.

Referring to FIG. 5, the display device 1 may include a communication interface 110, an input interface 120, a learning processor 130, a sensor 140, an output interface 150, a memory 170, and a processor 180.

The communication interface 110 may transmit and receive data to and from external devices, such as another terminal or an external server, by using a wired/wireless communication technology. For example, the communication interface 110 may transmit and receive sensor information, a user input, a learning model, and a control signal to and from the external devices.

In this case, the communication technology used by the communication interface 110 includes Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), and the like.

The input interface 120 may acquire various types of data.

At this time, the input interface 120 may include a camera for inputting a video signal, a microphone for receiving an audio signal, and a user input interface for receiving information from a user. The camera or the microphone may be treated as a sensor, and a signal acquired from the camera or the microphone may be referred to as sensing data or sensor information.

The input interface 120 may acquire learning data for model learning and input data to be used when an output is acquired by using a learning model. The input interface 120 may acquire raw input data. In this case, the processor 180 or the learning processor 130 may extract an input feature by preprocessing the input data.

The input interface 120 may include a camera 121 for receiving a video signal, a microphone 122 for receiving an audio signal, and a user input interface (user input unit) 123 for receiving information from a user.

Voice data or image data collected by the input interface 120 may be analyzed and processed as a user control command.

The input interface 120 is configured to input image information (or signal), audio information (or signal), data, or information input from a user. For input of image information, the display device 1 may include one or more cameras 121.

The camera 121 processes image frames of still images or moving images acquired by image sensors in a video call more or an image capture mode. The processed image frames may be displayed on the display (display unit) 31 or may be stored in the memory 170.

The microphone 122 processes an external sound signal into electrical voice data. The processed voice data may be utilized in various ways according to a function being executed by the display device 1 (or a running application program). On the other hand, various noise cancellation algorithms for canceling noise occurring in a process of receiving an external sound signal may be applied to the microphone 122.

The user input interface 123 receives information from a user. When information is received through the user input interface 123, the processor 180 may control the operation of the display device 1 in correspondence with the input information.

The user input interface 123 may include a mechanical input element (or a mechanical key, for example, a button, a dome switch, a jog wheel, a jog switch, and the like located on a front and/or rear surface or a side surface of the display device 1) or a touch input element. As one example, the touch input element may be a virtual key, a soft key, or a visual key, which is displayed on a touch screen through software processing, or a touch key located at a location other than the touch screen.

The learning processor 130 may learn a model composed of an artificial neural network by using training data. The learned artificial neural network may be referred to as a learning model. The learning model may be used to infer a result value for new input data rather than learning data, and the inferred value may be used as a basis for determination to perform a certain operation.

At this time, the learning processor 130 may include a memory that is integrated or implemented in the display device 1. Alternatively, the learning processor 130 may be implemented by using the memory 170, an external memory directly connected to the display device 1, or a memory held in an external device.

The sensor 140 may acquire at least one of internal information about the display device 1, ambient environment information about the display device 1, or user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display for outputting time information, a speaker for outputting auditory information, and a haptic module for outputting haptic information.

The output interface 150 may include at least one of a display (display unit) 31, a sound output interface (sound output unit) 152, a haptic module 153, or an optical output interface (optical output unit) 154.

The display 31 displays (outputs) information processed by the display device 1. For example, the display 31 may display execution screen information of an application program running in the display device 1 or user interface (UI) and graphic user interface (GUI) information according to the execution screen information.

The display 31 may implement a touch screen by forming a mutual layer structure with the touch sensor or by being integrally formed with the touch sensor. The touch screen may function as the user input interface 123 providing an input interface between the display device 1 and the user, and may also provide an output interface between the display device 1 and the user.

The sound output interface 152 may output audio data received from the communication interface 110 or stored in the memory 170 in a call signal reception mode, a call mode, a record mode, a voice recognition mode, a broadcast reception mode, and the like.

The sound output interface 152 may include at least one of a receiver, a speaker, or a buzzer.

The haptic module 153 generates various tactile effects that a user can feel. A representative example of the tactile effect generated by the haptic module 153 may be vibration.

The optical output interface 154 may output a signal for indicating event generation using light of a light source of the display device 1. Examples of the event generated in the display device 1 may include message reception, call signal reception, missed call, alarm, schedule notification, email reception, information reception through an application, and the like.

The memory 170 may store data that supports various functions of the display device 1. For example, the memory 170 may store input data acquired by the input interface 120, learning data, a learning model, a learning history, and the like.

The processor 180 may determine at least one executable operation of the display device 1 based on information determined or generated by using a data analysis algorithm or a machine learning algorithm. The processor 180 may control the components of the display device 1 to execute the determined operation.

To this end, the processor 180 may request, search, receive, or utilize data of the learning processor 130 or the memory 170. The processor 180 may control the components of the display device 1 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intent information for the user input and may determine the user's requirements based on the acquired intent information.

At this time, the processor 180 may acquire the intent information corresponding to the user input by using at least one of a speech to text (STT) engine for converting speech input into a text string or a natural language processing (NLP) engine for acquiring intent information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the external server, or may be learned by their distributed processing.

The processor 180 may collect history information including the operation contents of the display device 1 or the user's feedback on the operation and may store the collected history information in the memory 170 or the learning processor 130 or transmit the collected history information to the external device such as the external server. The collected history information may be used to update the learning model.

The processor 180 may control at least part of the components of the display device 1 so as to run an application program stored in memory 170. Furthermore, the processor 180 may operate two or more of the components included in the display device 1 in combination so as to run the application program.

Figure 6:
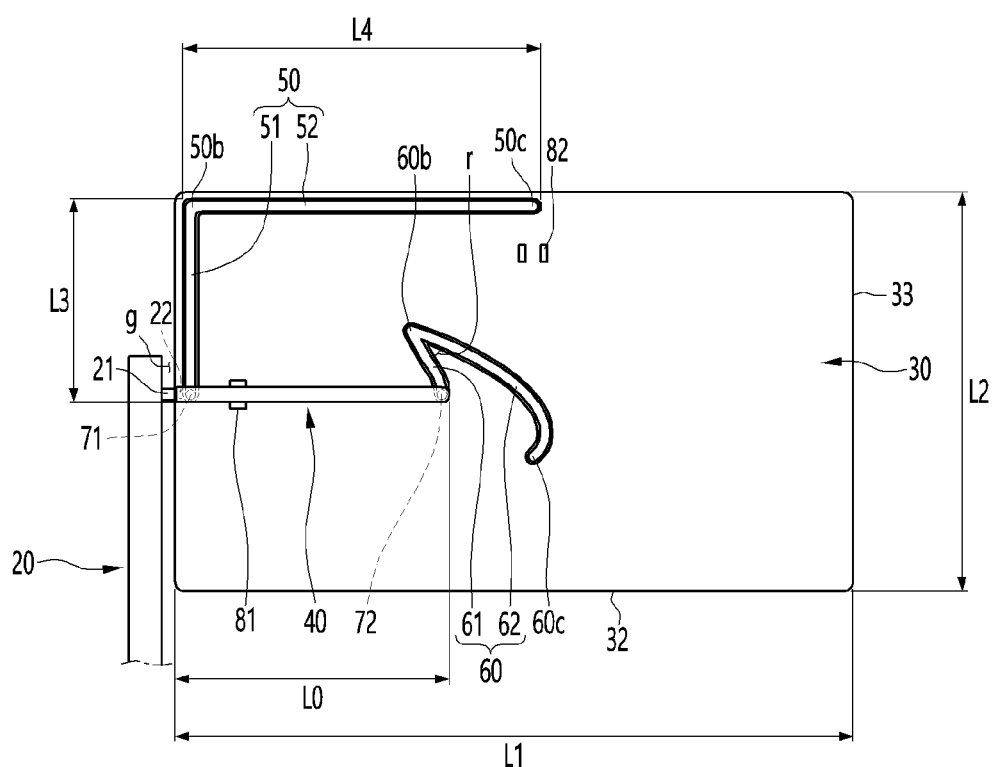
FIGS. 6 to 8 are views for describing the pivot operation of the head according to an embodiment of the present disclosure.
Figure 7:
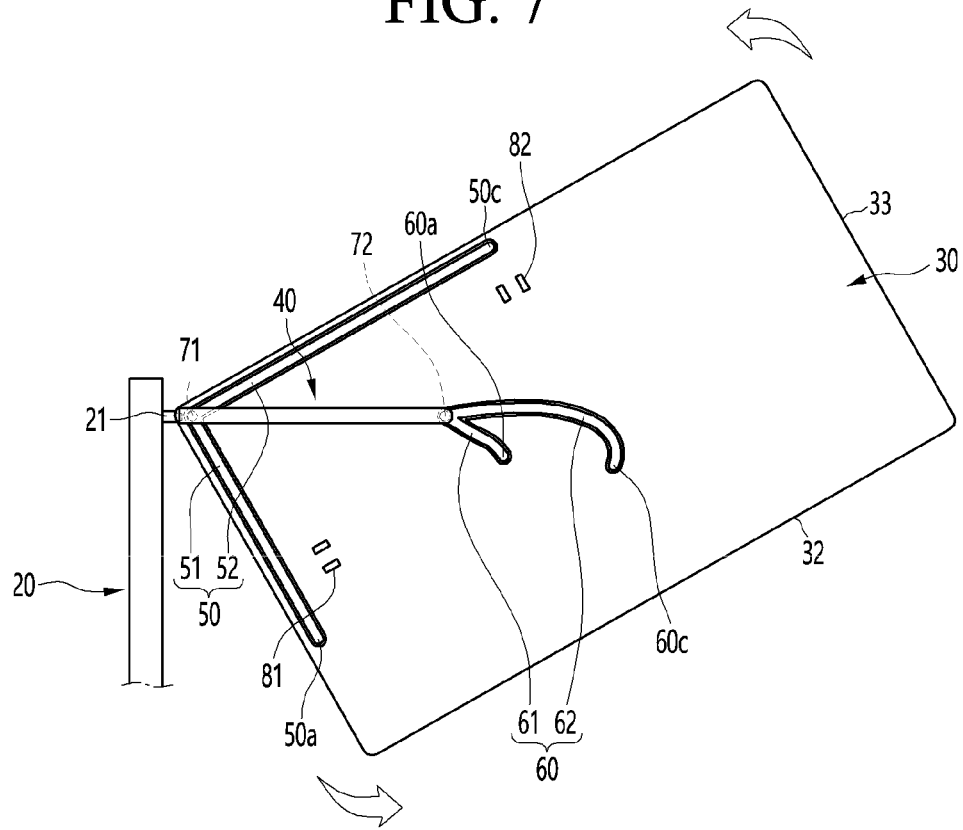
Figure 8:
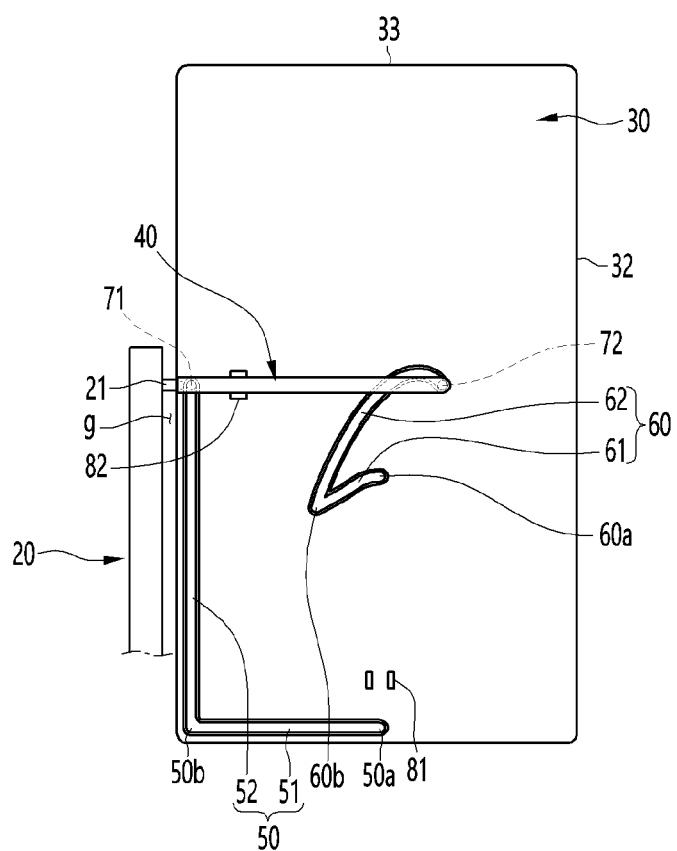
Figure 9:
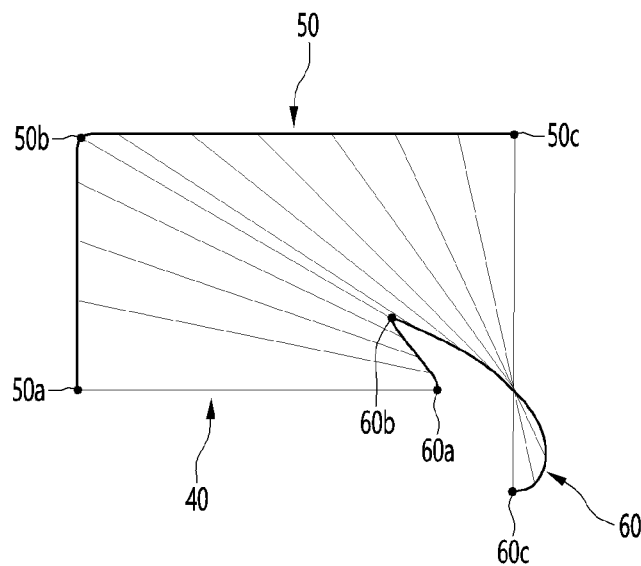
FIG. 9 is a view showing a trajectory of a connecting bar during the pivot operation of the head according to an embodiment of the present disclosure.

FIGS. 6 to 8 are views for describing the pivot operation of the head according to an embodiment of the present disclosure, and FIG. 9 is a view showing a trajectory of a connecting bar during the pivot operation of the head according to an embodiment of the present disclosure.

The display device 1 according to an embodiment of the present disclosure may further include a connecting bar 40, an outer rail 50, and an inner rail 60.

The connecting bar 40 may be located inside the head 30, and may be connected to the stand bar 20 through the through groove 34 (see FIG. 3). The connecting bar 40 may extend horizontally. The connecting bar 40 may maintain a horizontal state without rotating with the head 30 when the head 30 is pivoted.

In more detail, a protrusion 21 protruding horizontally may be formed on the stand bar 20, and a connecting pin 22 may extend from the end of the protrusion 21. The protrusion 21 may have a diameter or size that does not pass through the through groove 34.

The protrusion 21 may separate the peripheral portions 32 and 33 of the head 30 from the stand bar 20 in a horizontal direction. That is, a gap g may be formed between the peripheral portions 32 and 33 of the head 30 and the stand bar 20. Accordingly, the head 30 can pivot smoothly without interfering with the stand bar 20.

The connecting pin 22 may extend in parallel with the protrusion 21, may be inserted into the through groove 34, and may be connected to the end of the connecting bar 40. As described above, the connecting pin 22 may be rotatably connected to the connecting bar 40, and the head 30 may be tilted with respect to the connecting pin 22 together with the connecting bar 40.

The length L0 of the connecting bar 40 may be shorter than half of the length L1 of the long side 32 of the head 30 and longer than half of the length L2 of the short side 33 of the head 30.

The outer rail 50 and the inner rail 60 may be fixed to the inside of the head 30, and may rotate together with the head 30 when the head 30 is pivoted.

The inner rail 60 may be spaced inward apart from the outer rail 50. In more detail, the outer rail 50 may be fixed to the inner edge of the head 30, and the inner rail 60 may be fixed to the inner central portion of the head 30.

The outer rail 50 may extend along the through groove 34, and the inner rail 60 may include a curved trajectory.

The outer rail 50 may be connected to the connecting bar 40 by a first hinge 71, and the inner rail 60 may be connected to the connecting bar 40 by a second hinge 72. In more detail, the outer end of the connecting bar 40 may be connected to the outer rail 50 by the first hinge 71, and the inner end of the connecting bar 40 may be connected to the inner rail 60 by the second hinge 72.

The hinge axes of the first hinge 71 and the second hinge 72 may be in a direction perpendicular to the front surface of the head 30, that is, the display 31. In addition, the hinge axes of the first hinge 71 and the second hinge 72 may be in a direction perpendicular to the connecting pin 22 of the stand bar 20.

The first hinge 71 and the second hinge 72 may be constrained in the longitudinal direction of the connecting bar 40. The first hinge 71 may be unconstrained in the longitudinal direction of the outer rail 50, and the second hinge 72 may be unconstrained in the longitudinal direction of the inner rail 60.

Accordingly, when the head 30 is pivoted, the positions of the first hinge 71 and the second hinge 72 with respect to the connecting bar 40 may be fixed. In addition, the outer rail 50 may slide with respect to the first hinge 71, and the inner rail 60 may slide with respect to the second hinge 72.

The connecting bar 40 may be rigid and may not be variable in length. Accordingly, the pivot trajectory of the head 30 may be determined by the shapes of the outer rail 50 and the inner rail 60.

The outer rail 50 may include a first outer rail 51 extending in parallel with the short side 33 of the head 30, and a second outer rail 52 extending parallel to the long side 32 of the head 30.

The first outer rail 51 and the second outer rail 52 may be connected to each other. A connecting portion 50b of the first outer rail 51 and the second outer rail 52 may be located at a position corresponding to the edge of the head 30.

The first outer rail 51 and the second outer rail 52 may be integrally formed in a single body. The first outer rail 51 may be formed by bending the second outer rail 52. The connecting portion 50b of the first outer rail 51 and the second outer rail 52 may be a bent portion of the outer rail 50.

The first outer rail 51 may be perpendicular to the second outer rail 52.

The length L3 of the first outer rail 51 may be shorter than the length L2 of the short side 33 of the head 30, and may be at least half the length L2 of the short side 33 of the head 30.

The length L4 of the second outer rail 52 may be shorter than the length L1 of the long side 32 of the head 30, and may be at least half of the length L1 of the long side 32 of the head 30.

The inner rail 60 may include a first inner rail 61 and a second inner rail 62 bent from the first inner rail 61.

The first inner rail 61 and the second inner rail 62 may be connected to each other. The first inner rail 61 and the second inner rail 62 may be integrally formed in a single body. The first inner rail 61 may be formed by bending the second inner rail 62. A connecting portion 60b of the first inner rail 61 and the second inner rail 62 may be a bent portion of the inner rail 60.

Each of the first inner rail 61 and the second inner rail 62 may include a curved trajectory The length of the second inner rail 62 may be longer than the length of the first inner rail 61.

An angle r between the first inner rail 61 and the second inner rail 62 may be less than 90 degrees. That is, the angle may be an acute angle.

Referring to FIG. 6, in the landscape mode of the head 30, the first hinge 71 may be located at one end 50a of the outer rail 50, that is, at the end 50a of the first outer rail 51. In addition, the second hinge 72 may be located at one end 60a of the inner rail 60, that is, the end 60a of the first inner rail 61.

That is, in the landscape mode of the head 30, the first inner rail 61 may be connected to the first outer rail 51 by the connecting bar 40. The connecting bar 40 may connect one end 50a of the outer rail 50 to one end 60a of the inner rail 60.

Referring to FIG. 7, the connecting portion 50b of the first outer rail 51 and the second outer rail 52 may pass through the first hinge 71 during the pivot operation of the head 30. In addition, the connecting portion 60b of the first inner rail 61 and the second inner rail 62 may pass through the second hinge 72.

Referring to FIG. 8, in the portrait mode of the head 30, the first hinge 71 may be located at the other end 50c of the outer rail 50, that is, the end 50c of the second outer rail 52. In addition, the second hinge 72 may be located at the other end 60c of the inner rail 60, that is, the end 60c of the second inner rail 62.

That is, in the portrait mode of the head 30, the second inner rail 62 may be connected to the second outer rail 52 by the connecting bar 40. The connecting bar 40 may connect the other end 50c of the outer rail 50 to the other end 60c of the inner rail 60.

Referring to FIG. 9, a plurality of positions included in the outer rail 50 may be spaced apart from a plurality of positions included in the inner rail 60 by a predetermined distance and correspond thereto one-to-one. The predetermined distance may mean a distance between the first hinge 71 and the second hinge 72 in the longitudinal direction of the connecting bar 40.

In more detail, the distance between the end 50a of the first outer rail 51 and the end 60a of the first inner rail 61 may be equal to the distance between the first hinge 71 and the second hinge 72.

In addition, the distance between the end 50c of the second outer rail 52 and the end 60c of the second inner rail 62 may be equal to the distance between the first hinge 71 and the second hinge 72.

In addition, the distance from the connecting portion 50b of the first outer rail 51 and the second outer rail 52 to the connecting portion 60b of the first inner rail 61 and the second inner rail 62 may be equal to the distance between the first hinge 71 and the second hinge 72.

Accordingly, the pivot of the head 30 may be smoothly performed without changing the length of the connecting bar 40.

On the other hand, latches 81 and 82 protruding inward may be provided on the inner surface of the head 30. The latches 81 and 82 may be supported by the connecting bar 40. The latches 81 and 82 may constrain the head 30 to the connecting bar 40.

In addition, the head 30 may include an elastic member (not shown) for pressing the latches 81 and 82 in the protruding direction. When the latches 81 and 82 are pressed by the connecting bar 40, the elastic member may be compressed. In addition, when the connecting bar 40 does not press the latches 81 and 82, the latches 81 and 82 may maintain a state of protruding to the inside of the head 30 by the elastic force of the elastic member.

Therefore, when sufficient external force is not applied to the head 30, the head 30 may maintain the landscape mode state or the portrait mode state. In addition, when the user rotates the head 30 by applying external force to the head 30, the connecting bar 40 is not caught on the latches 81 and 82 and the pivot of the head 30 can be smoothly performed.

In more detail, the latches 81 and 82 may include a first latch 81 for constraining the head 30 to the connecting bar 40 during the landscape mode of the head 30, and a second latch 82 for constraining the head 30 to the connecting bar 40 during the portrait mode of the head 30.

The first latch 81 may include one protruding piece located above the connecting bar 40 during the landscape mode of the head 30. The first latch 81 may further include another protruding piece located below the connecting bar 40 in the landscape mode of the head 30.

The first latch 81 may prevent the head 30 in the landscape mode from rotating or moving downward when sufficient external force is not applied to the head 30.

The second latch 82 may include one protruding piece located below the connecting bar 40 during the portrait mode of the head 30. The second latch 82 may further include another protruding piece located above the connecting bar 40 during the landscape mode of the head 30.

The second latch 82 may prevent the head 30 in the portrait mode from rotating or moving upward when sufficient external force is not applied to the head 30.

Figure 10:
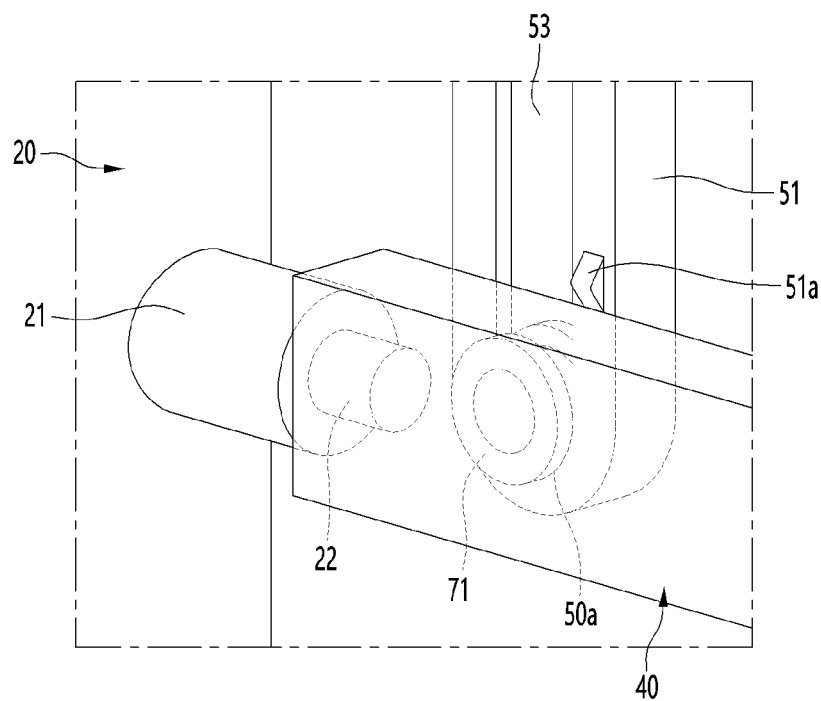
FIG. 10 is an enlarged view showing an end of a first outer rail and a periphery thereof when the head is in a landscape mode, according to an embodiment of the present disclosure.
Figure 11:
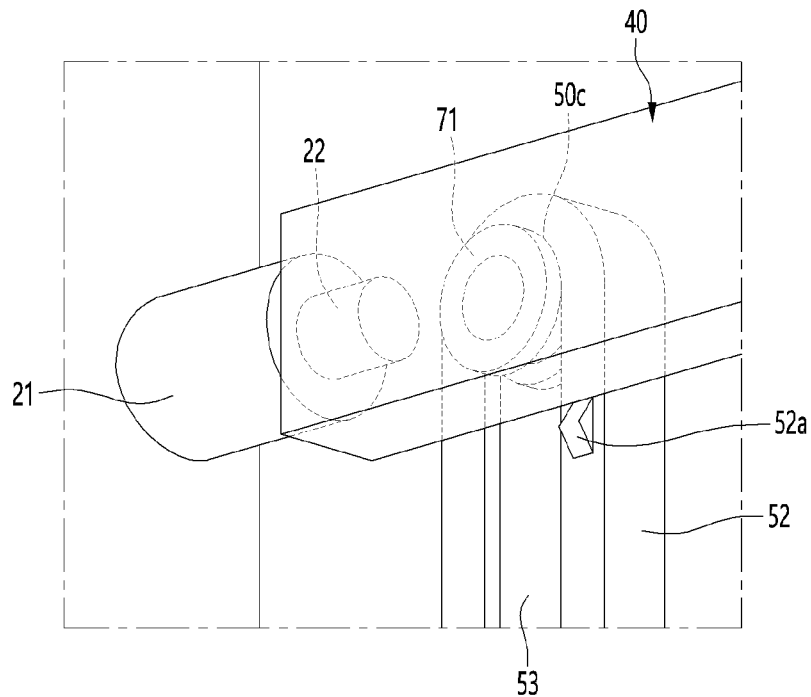
FIG. 11 is an enlarged view showing an end of a second outer rail and a periphery thereof when the head is in a portrait mode, according to an embodiment of the present disclosure.

FIG. 10 is an enlarged view showing the end of the first outer rail and the periphery thereof when the head is in the landscape mode, according to an embodiment of the present disclosure, and FIG. 11 is an enlarged view showing the end of the second outer rail and the periphery thereof when the head is in the portrait mode, according to an embodiment of the present disclosure.

A sliding groove 53 to which the first hinge 71 is connected may be formed in the outer rail 50. The sliding groove 53 may extend in the longitudinal direction of the outer rail 50. In more detail, the sliding groove 53 may extend from one end 50*a* to the other end 50*c* of the outer rail 50.

The outer rail 50 may slide with respect to the first hinge 71 in a state in which the first hinge 71 is inserted into the sliding groove 53. The sliding groove 53 may constrain the first hinge 71 in the front-and-rear direction, and may not constrain the first hinge 71 in the longitudinal direction of the outer rail 50.

Those of ordinary skill in the art will also be able to easily understand the sliding groove formed in the inner rail 60 and connected to the second hinge 72.

On the other hand, protrusions 51*a* and 52*a* may protrude from the outer rail 50.

The protrusions 51*a* and 52*a* may be supported by the connecting bar 40. The protrusions 51*a* and 52*a* may constrain the outer rail 50 and the head 30 fixed thereto to the connecting bar 40.

In addition, an elastic member (not shown) for pressing the protrusions 51*a* and 52*a* in the protruding direction may be provided on the outer rail 50. The elastic member may be located inside the outer rail 50.

When the protrusions 51*a* and 52*a* are pressed by the connecting bar 40, the elastic member may be compressed. In addition, when the connecting bar 40 does not press the protrusions 51*a* and 52*a*, the protrusions 51*a* and 52*a* may maintain a state of protruding from the outer rail 50 by the elastic force of the elastic member.

Therefore, when sufficient external force is not applied to the head 30, the head 30 may maintain the landscape mode state or the portrait mode state. In addition, when the user rotates the head 30 by applying external force to the head 30, the connecting bar 40 is not caught on the protrusions 51*a* and 52*a* and the pivot of the head 30 can be smoothly performed.

In more detail, the protrusions 51*a* and 52*a* may include a first protrusion 51*a* for constraining the first outer rail 51 to the connecting bar 40 during the landscape mode of the head 30, and a second protrusion 52*a* for constraining the second outer rail 52 to the connecting bar 40 during the portrait mode of the head 30.

The first protrusion 51*a* may be located above the connecting bar 40 during the landscape mode of the head 30. The first protrusion 51*a* may be adjacent to the end 50*a* of the first outer rail 51 and located around the sliding groove 53.

The first protrusion 51*a* together with the first latch 81 may prevent the head 30 in the landscape mode from rotating or moving downward when sufficient external force is not applied to the head 30.

The second protrusion 52*a* may be located below the connecting bar 40 during the portrait mode of the head 30. The second protrusion 52*a* may be adjacent to the end 50*c* of the second outer rail 52 and located around the sliding groove 53.

The second protrusion 52*a* together with the second latch 82 may prevent the head 30 in the portrait mode from rotating or moving upward when sufficient external force is not applied to the head 30.

In addition, of course, the display device 1 may have a configuration in which only one of the latches 81 and 82 and the protrusions 51*a* and 52*a* is provided.

Figure 12:
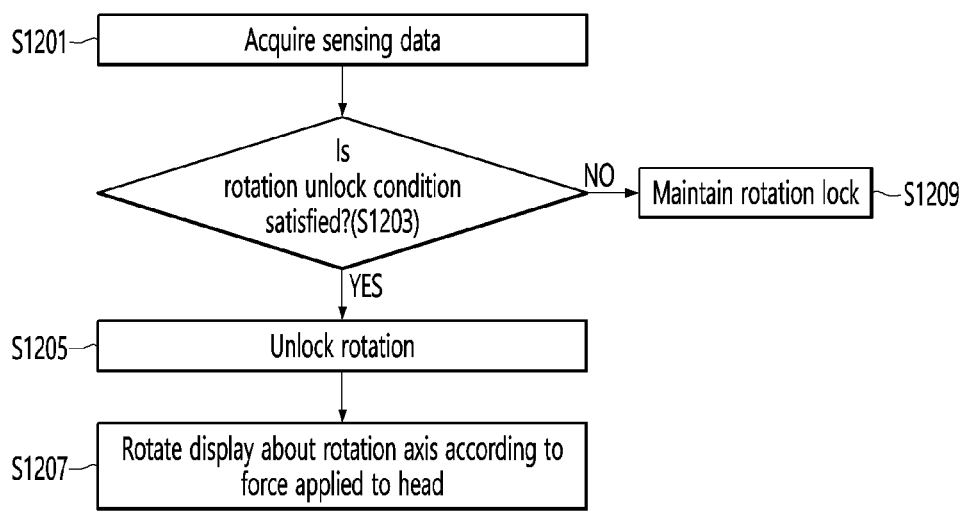
FIG. 12 is a flowchart for describing an operating method of a display device, according to an embodiment of the present disclosure.

FIG. 12 is a flowchart for describing an operating method of a display device, according to an embodiment of the present disclosure.

In particular, FIG. 12 is a view for describing a method of determining whether to unlock the rotation of the display 31 based on sensing data.

Hereinafter, the rotation lock state of the head 30 is interpreted as the same as the rotation lock state of the display 31.

Referring to FIG. 12, the processor 180 of the display device 1 acquires sensing data through the sensor 140 (S1201).

In an embodiment, the sensing data may be touch input data sensed on the display area of the display 31. The touch input data may be capacitance.

When the display 31 is implemented as a touch screen, the touch screen may include a touch sensor, and the touch sensor may acquire touch input data.

The display area of the display 31 is an area for displaying information, and may be an area in which a touch input is possible.

In another embodiment, the sensing data may be touch data acquired by a touch sensor (not shown) provided in a predetermined area of the peripheral portions 32 and 33.

The processor 180 determines whether the rotation unlock condition of the display 31 is satisfied, based on the sensing data (S1203).

The rotation unlock condition of the display 31 may be a condition necessary to rotate the display 31.

When one or more rotation unlock conditions of the display 31 are satisfied, the display 31 may be in a rotatable state.

In an embodiment, when a touch input is sensed in a predetermined area of the display area of the display 31, the processor 180 may determine that the rotation unlock condition of the display 31 is satisfied.

In another embodiment, when a touch is sensed in a predetermined area of the peripheral portions 32 and 33 of the display 31, the processor 180 may determine that the rotation unlock condition of the display 31 is satisfied.

A touch sensor may be provided in the first area of the long side 32 or the second area of the short side 33 constituting the peripheral portions. When a touch is sensed in one of the first area of the long side 32 and the second area of the short side 33, the processor 180 may determine that the rotation unlock condition of the display 31 is satisfied.

FIGS. 13a to 15b are views for describing the rotation unlock condition of the display according to an embodiment of the present disclosure.

Figure 13A:
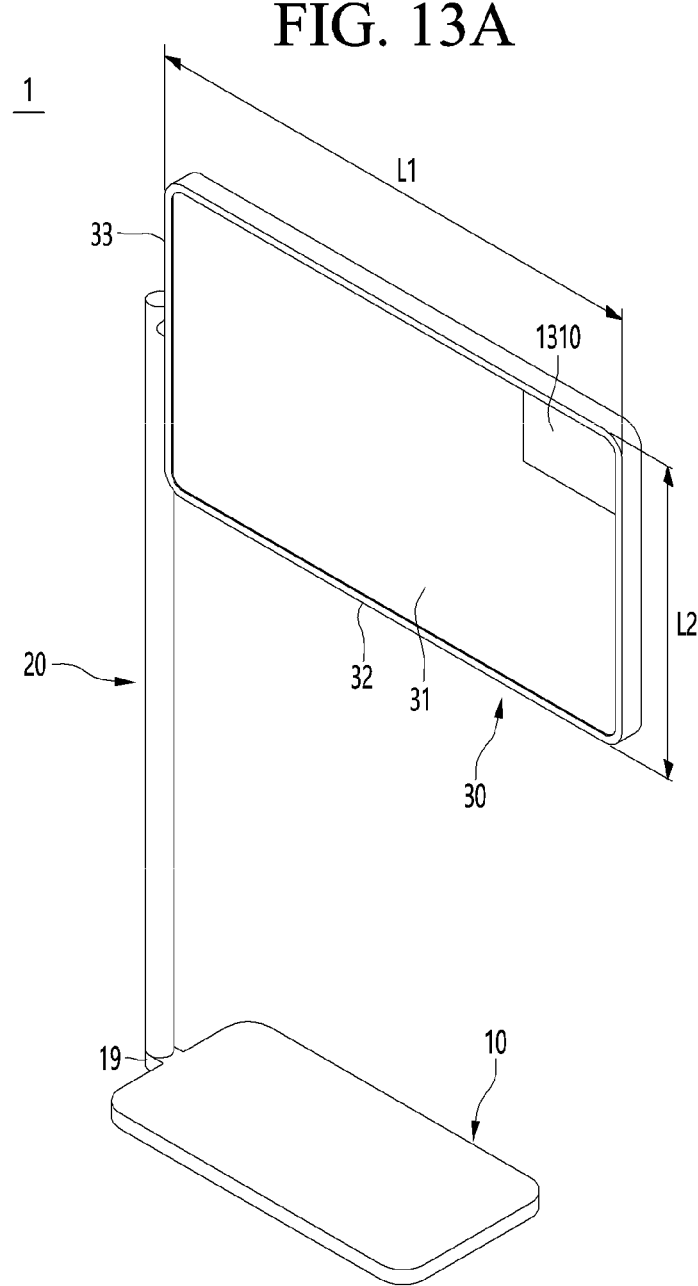
FIGS. 13*a* to 15*b* are views for describing the rotation unlock condition of the display according to an embodiment of the present disclosure.
Figure 13B:
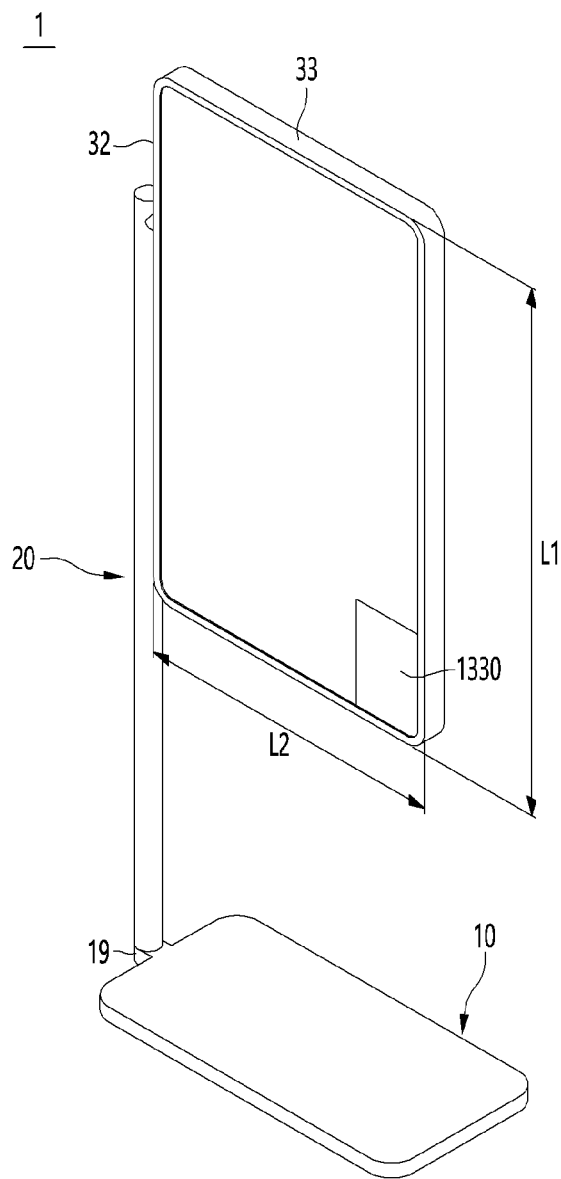

First, FIGS. 13A and 13B are examples in which it is determined that the rotation unlock condition of the display 31 is satisfied when a touch is sensed in a predetermined area of the display area of the display 31.

FIG. 13a shows that the display 31 is in a landscape mode, and FIG. 13b shows that the display 31 is in a portrait mode.

Referring to FIG. 13a, the display 31 may be in a landscape mode, and the rotation of the display 31 may be in a lock state. When the rotation of the display 31 is in the lock state, the display 31 may not be rotated even if external force is applied to the head 30.

For example, when a touch is sensed on a first area 1310 of the display 31, the processor 180 may unlock the rotation lock state of the display 31.

As another example, when a plurality of touch inputs are sensed on the first area 1310 of the display 31, the processor 180 may determine that the rotation unlock condition of the display 31 is satisfied, and may unlock the rotation lock state of the display 31.

As another example, when a touch is sensed on the first area 1310 for a predetermined time, the processor 180 may unlock the rotation lock state of the display 31.

As another example, when a touch input is sensed on the first area 1310 and a force for moving the head 30 in a vertical downward direction is sensed, the processor 180 may unlock the rotation lock state of the display 31.

The first area 1310 of the display 31 may be an area located at the upper right end The first area 1310 may have a rectangular shape, but the present disclosure is not limited thereto, and the first area 1310 may have various shapes such as an oval shape.

The processor 180 may measure capacitance of a capacitor provided in the first area 1310 of the display 31. When the change in capacitance is greater than or equal to a preset change, the processor 180 may determine that a touch input is sensed.

Referring to FIG. 13b, the display 31 may be in a portrait mode, and may be in a lock state in which the rotation of the display 31 is locked.

When a touch input is sensed on the second area 1330 of the display 31, the processor 180 may unlock the rotation lock state of the display 31.

As another example, when a plurality of touch inputs are sensed on the second area 1330, the processor 180 may unlock the rotation lock state of the display 31.

As another example, when a touch input is sensed on the second area 1330 for a predetermined time, the processor 180 may unlock the rotation lock state of the display 31.

As another example, when a touch input is sensed on the second area 1330 and a force for pushing the head 30 in a horizontal left direction is sensed, the processor 180 may determine that the rotation lock state of the display 31 is unlocked.

The second area 1330 may be an area located at the lower right end of the display 31 in the portrait mode with respect to the center of the display 31. The second area 1330 may have a rectangular shape, but the present disclosure is not limited thereto, and the second area 1330 may have various shapes such as an oval shape.

The processor 180 may measure capacitance of a capacitor provided in the second area 1330 of the display 31. When the change in capacitance is greater than or equal to a preset change, the processor 180 may determine that a touch input is sensed.

The first area 1310 and the second area 1330 may be the same area.

Next, FIGS. 14a and 14b will be described.

Figure 14A:
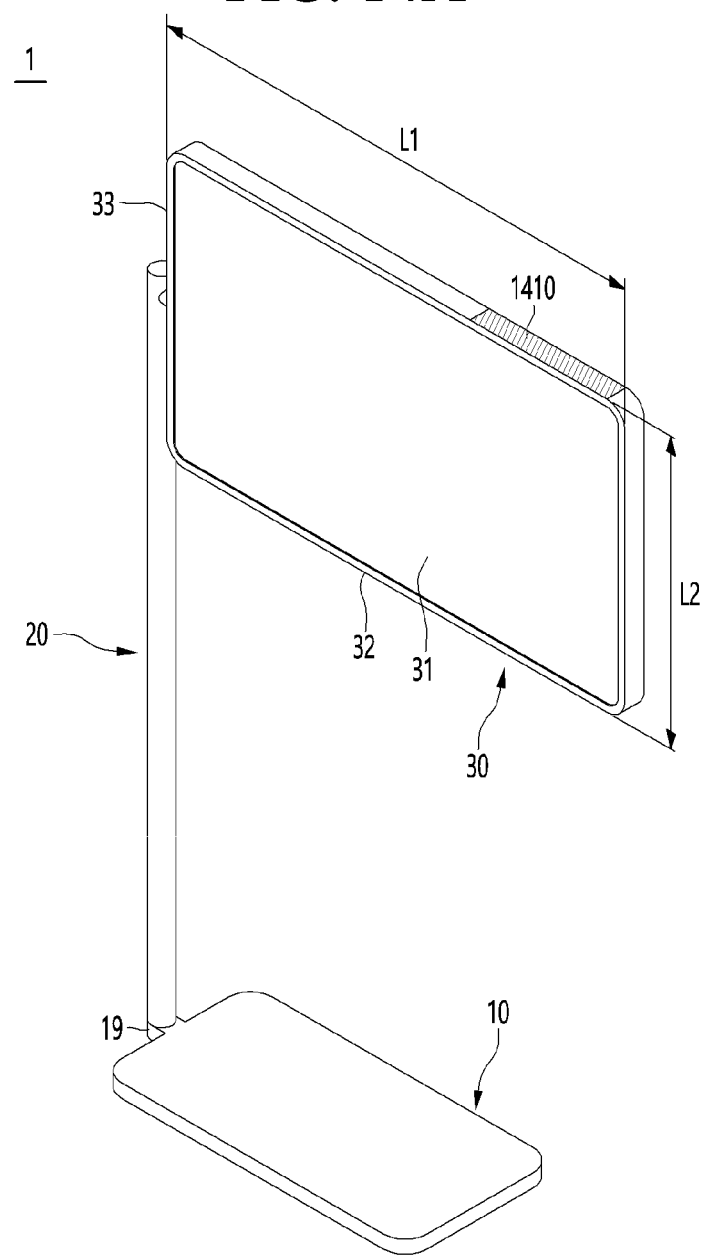
Figure 14B:
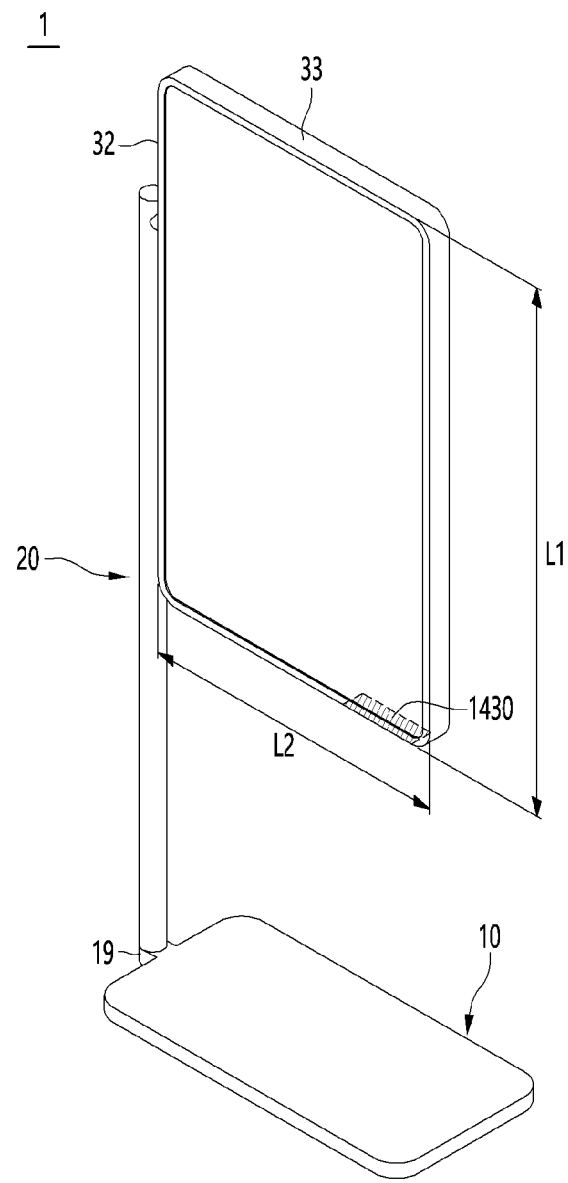

FIGS. 14a and 14b are views for describing that the rotation lock state of the display 31 is unlocked as a touch occurs on a predetermined part of the peripheral portions 32 and 33 of the head 30.

FIG. 14a shows that the display 31 is in a landscape mode, and FIG. 14b shows that the display 31 is in a portrait mode.

The head 30 may include the peripheral portions 32 and 33 surrounding the display 31, and the predetermined portion of the peripheral portions 32 and 33 may include a touch sensor for unlocking the rotation lock state of the display 31.

Referring to FIG. 14a, one or more touch sensors (not shown) may be provided in a first part 1410 of the upper long side 32. When a user's touch or a touch input occurs in the first part 1410, the processor 180 may determine that the rotation lock state of the display 31 is unlocked.

The first part 1410 may be located at the upper right end with respect to the center of the display 31.

Referring to FIG. 14b, in the portrait mode, one or more touch sensors (not shown) may be provided in a second part 1430 of the short side 33. When a user's touch or a touch input occurs in the second part 1430, the processor 180 may determine that the rotation lock state of the display 31 is unlocked.

Figure 15A:
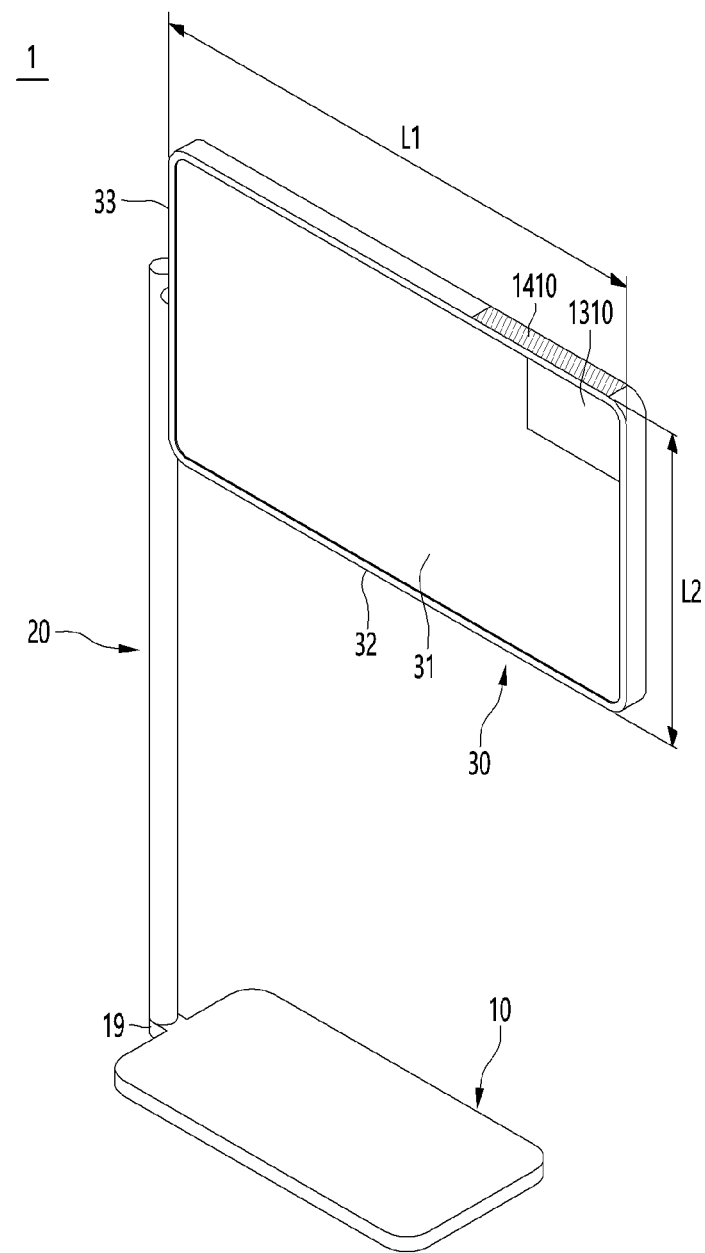
Figure 15B:
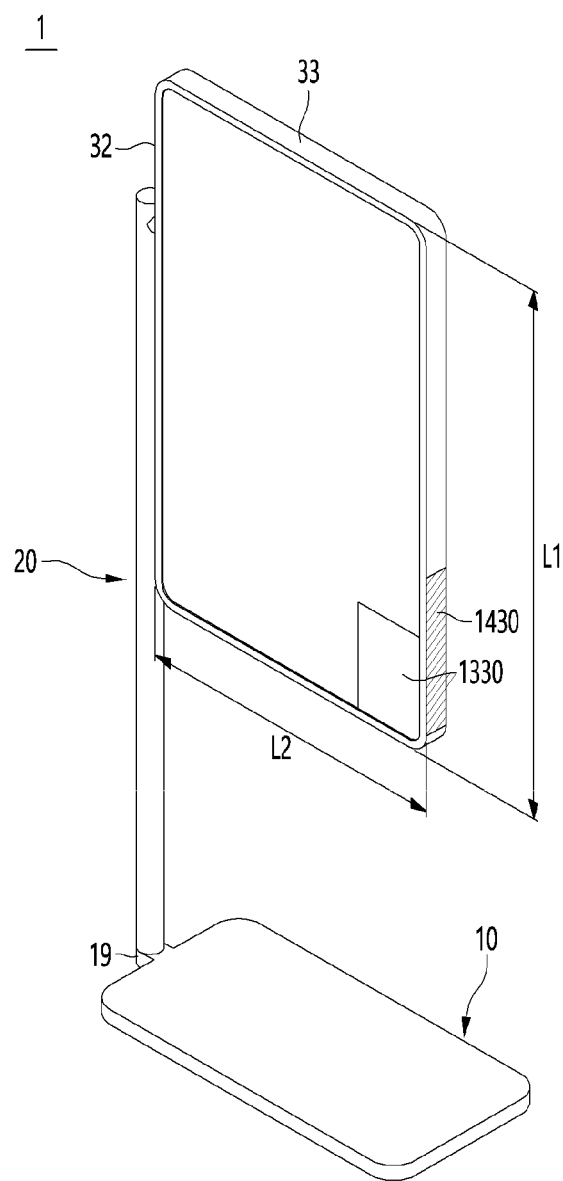

FIGS. 15a and 15b show an example of determining that the rotation unlock condition of the display 31 is satisfied when a touch is sensed on a predetermined area of the display area of the display 31 and a touch is sensed on a predetermined part of the peripheral portions 32 and 33.

Referring to FIG. 15a, when a touch input is sensed on the first area 1310 and a user's touch is sensed on the first part 1410, the processor 180 may determine that the rotation unlock state of the display 31 is unlocked.

When the first part 1410 is pressed in a vertical direction, the processor 180 may automatically rotate the display 31 along the rotation axis. To this end, a motor (not shown) capable of automatically rotating the display 31 may be provided inside the head 30.

Referring to FIG. 15*b*, when a touch input is sensed on the second area 1330 and a user's touch is sensed on the second part 1430, the processor 180 may determine that the rotation unlock state of the display 31 is unlocked.

That is, in FIGS. 15*a* and 15*b*, the rotation unlock condition of the display 31 may be a case where the touch input on the display area and the touch input on the peripheral portions 32 and 33 are simultaneously sensed.

A condition for unlocking the rotation lock state of the display 31 may vary depending on the arrangement mode of the display 31. That is, an area or a part for unlocking the rotation unlock state of the display 31 may vary according to the arrangement mode of the display 31.

Again, FIG. 12 is described.

When the rotation unlock condition of the display 31 is satisfied, the processor 180 unlocks the rotation of the display 31 (S1205), and rotates the display 31 along the rotation axis according to the force applied to the head 30 (S1207).

The processor 180 may rotate the head 30 when the rotation unlock condition of the display 31 is satisfied and a force is applied to the head 30.

The process of rotating the head 30 is replaced with the description of FIGS. 6 to 8.

Even if the rotation lock state of the display 31 is unlocked, when sufficient external force is not applied to the head 30, the head 30 may maintain the landscape mode or the portrait mode.

A motor (not shown) for pressing the latches 81 and 82 when the rotation lock state of the display 31 is unlocked may be provided.

When the rotation unlock condition of the display 31 is satisfied, the processor 180 may transmit, to a motor (not shown), a control signal for pressing the latches 81 and 82. Accordingly, the motor is driven, the latches 81 and 82 are pressed and the display 31 may be in a rotatable state.

When the rotation unlock condition of the display 31 is not satisfied, the processor 180 maintains the rotation lock of the display 31 (S1209).

Figure 16A:
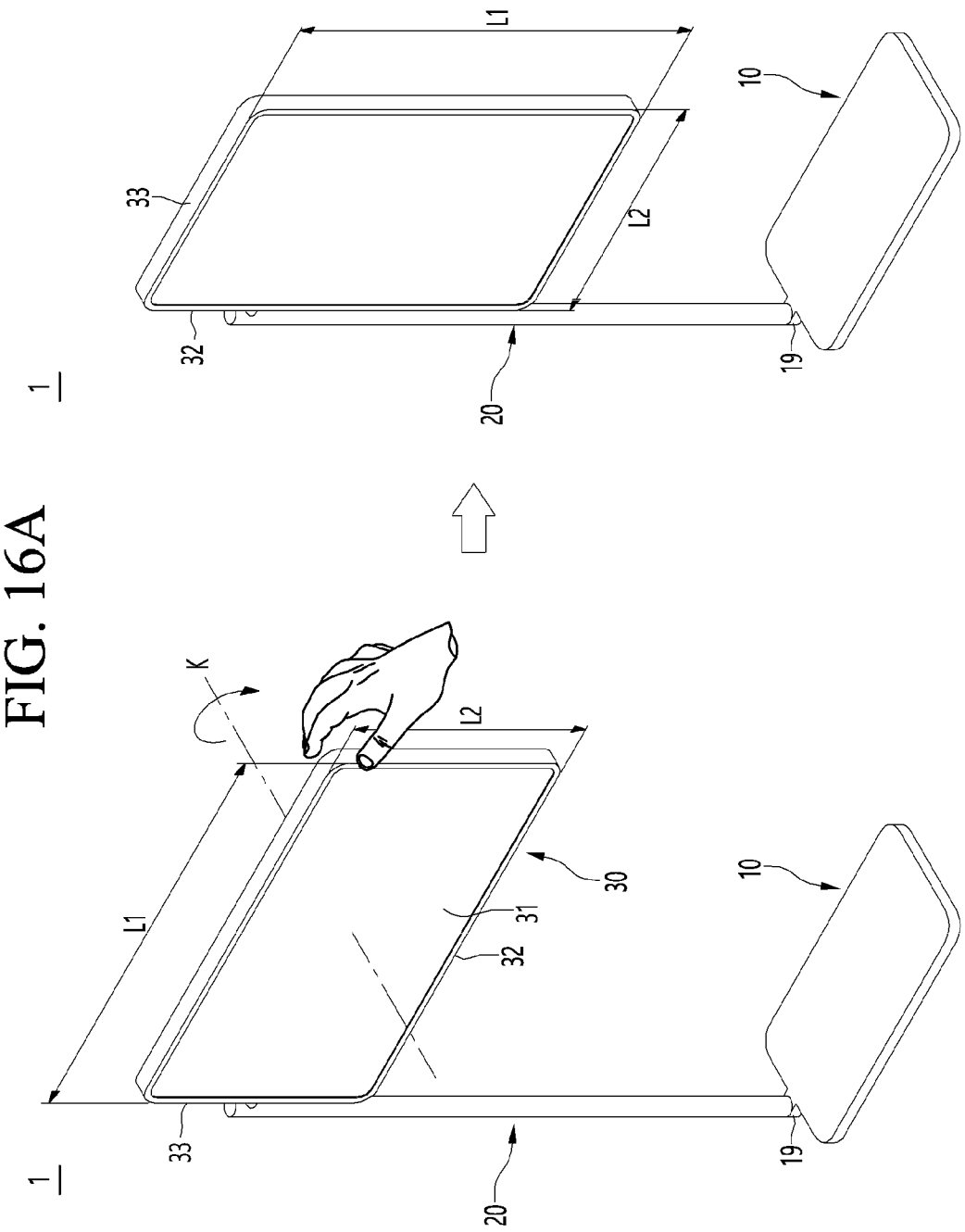
FIGS. 16*a* and 16*b* are views for describing a process in which a display is rotated when the rotation unlock condition of the display is satisfied, according to an embodiment of the present disclosure.
Figure 16B:
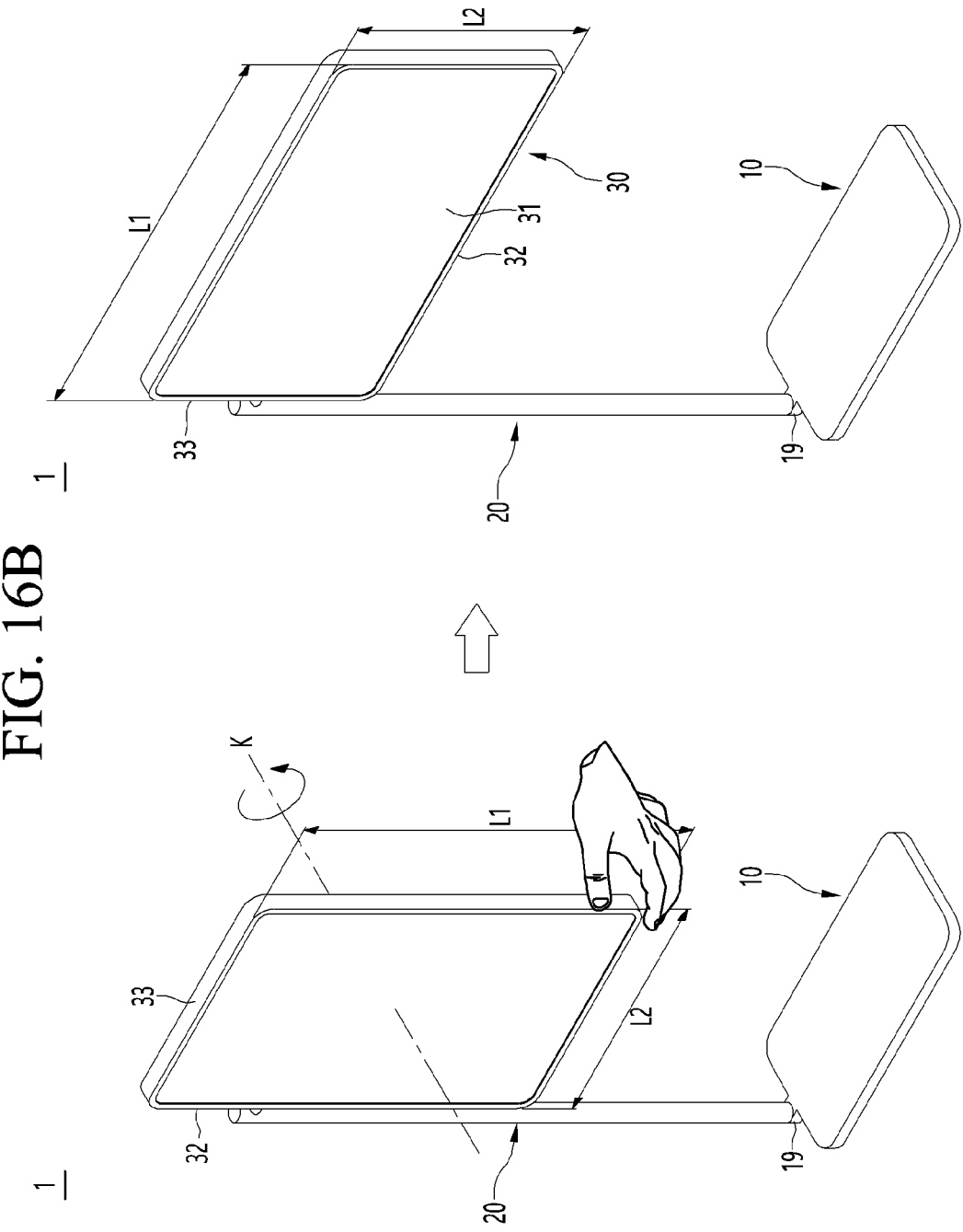

FIGS. 16*a* and 16*b* are views for describing a process in which the display is rotated when the rotation unlock condition of the display is satisfied, according to an embodiment of the present disclosure.

FIG. 16*a* is a view for describing an example in which the display 31 rotates from the landscape mode to the portrait mode, and FIG. 16*b* is a view for describing an example in which the display rotates from the portrait mode to the landscape mode.

Referring to FIG. 16*a*, when the rotation unlock condition of the display 31 is satisfied, the processor 180 may rotate the display 31 about the rotation axis K of the display 31 in the first direction.

Accordingly, the arrangement mode of the display 31 may be switched from the landscape mode to the portrait mode.

Referring to FIG. 16*b*, when the rotation unlock condition of the display 31 is satisfied, the processor 180 may rotate the display 31 about the rotation axis K of the display 31 in the second direction opposite to the first direction.

Accordingly, the arrangement mode of the display 31 may be switched from the portrait mode to the landscape mode.

Figure 17A:
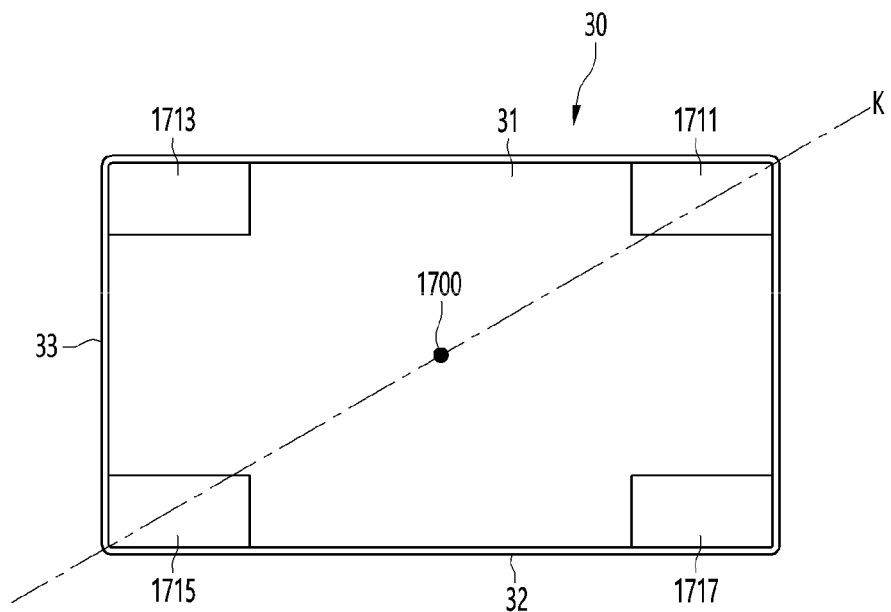
FIGS. 17*a* to 17*c* are views for describing a process of selecting a predetermined area of a display area and a predetermined part of a peripheral portion used for the rotation unlock condition of the display, according to an embodiment of the present disclosure.
Figure 17B:
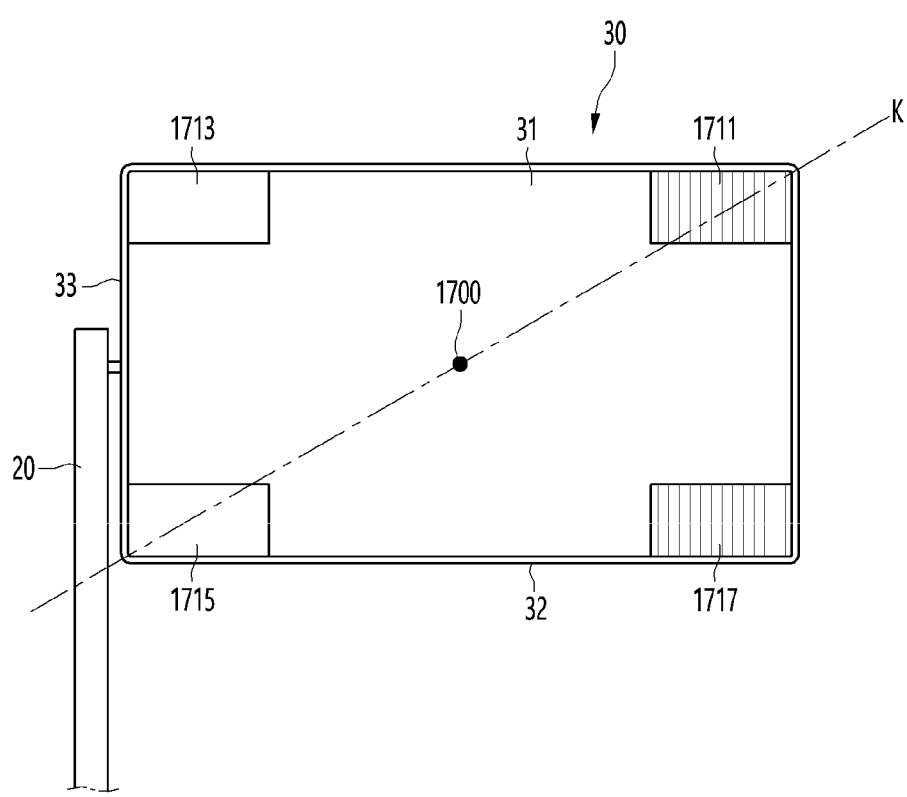
Figure 17C:
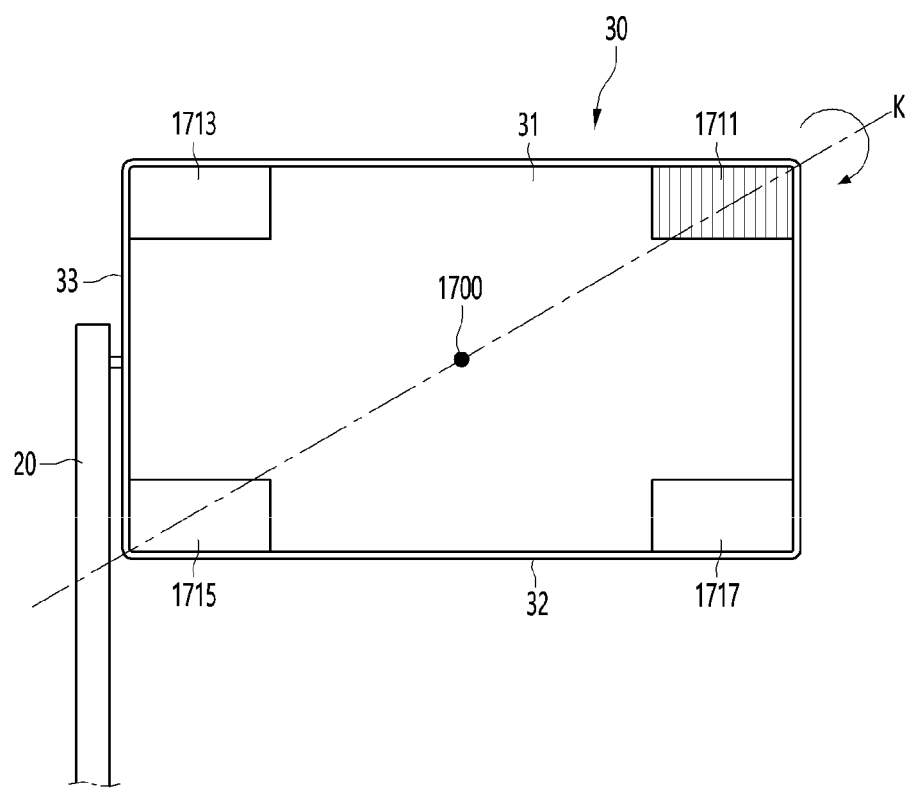

FIGS. 17*a* to 17*c* are views for describing a process of selecting a predetermined area of a display area and a predetermined part of a peripheral portion used for the rotation unlock condition of the display, according to an embodiment of the present disclosure.

FIGS. 17*a* to 17*c* assume that the display 31 is in the landscape mode.

Referring to FIG. 17*a*, four areas 1711, 1713, 1715, and 1717 of the furthest corners are to be extracted with respect to a center 1700 of a rotation axis K of a display 31 of a head 30.

Referring to FIG. 17*b*, two areas 1711 and 1717 furthest from the upper end of the stand bar 20 supporting the head 30 may be extracted from the four areas 1711, 1713, 1715, and 1717 as candidate areas.

Thereafter, among the two areas 1711 and 1717, the first area 1711, which is the position where the user requires the least force, may be selected as the area for unlocking the rotation lock state, based on the rotation axis K.

Figure 18:
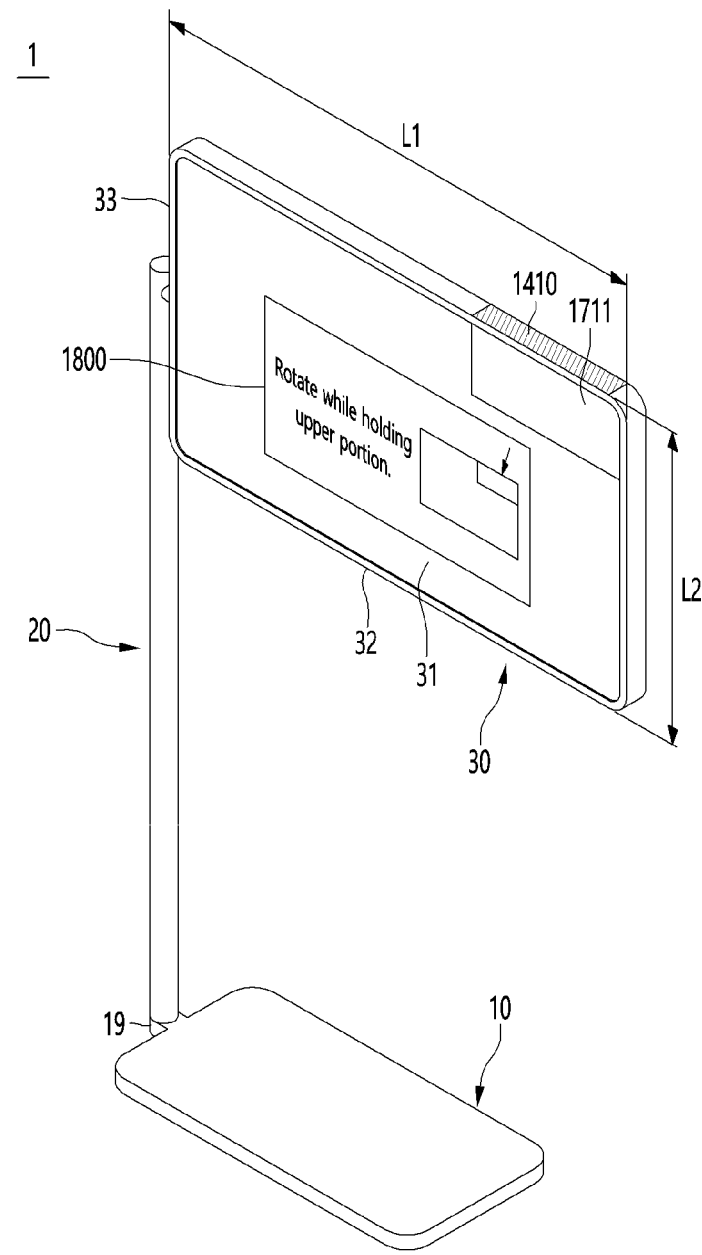
FIG. 18 is a view for describing an example of outputting guide information indicating to guide rotation of the head, according to an embodiment of the present disclosure.

FIG. 18 is a view for describing an example of outputting guide information for guiding rotation of the head, according to an embodiment of the present disclosure.

Referring to FIG. 18, the display device 1 may display, on the display 31, guide information 1800 indicating to hold and rotate a specific position of the head 30.

The guide information 1800 may indicate that the rotation of the head 30 is possible when the rotation unlock condition of the head 30 is satisfied.

The guide information 1800 may include text and images for guiding the holding and rotation of the first part 1410 of the first area 1711. The image may represent a specific part 1410 included in the peripheral portion 32 of the head 30.

When the rotation lock state of the display 31 is unlocked, the processor 180 of the display device 1 may display the guide information 1800 on the display 31.

The user may receive a guide on which part of the head 30 to hold and turn through the guide information 1800. Accordingly, when the display 31 is rotated, the risk of damaging the device may be significantly reduced.

According to another embodiment of the present disclosure, the display device 1 may output the guide information as a sound.

As another example, the display device 1 may display the guide information on the display 31 while outputting the guide information as a sound.

When the rotation lock state of the display 31 is unlocked and the rotation is started, the display device 1 may display a notification indicating that the display 31 is being rotated or may output the notification as a sound.

On the other hand, according to an embodiment of the present disclosure, when the display device 1 is tilted, the rotation lock state of the display 31 may be maintained even when the rotation unlock condition is satisfied.

Figure 19:
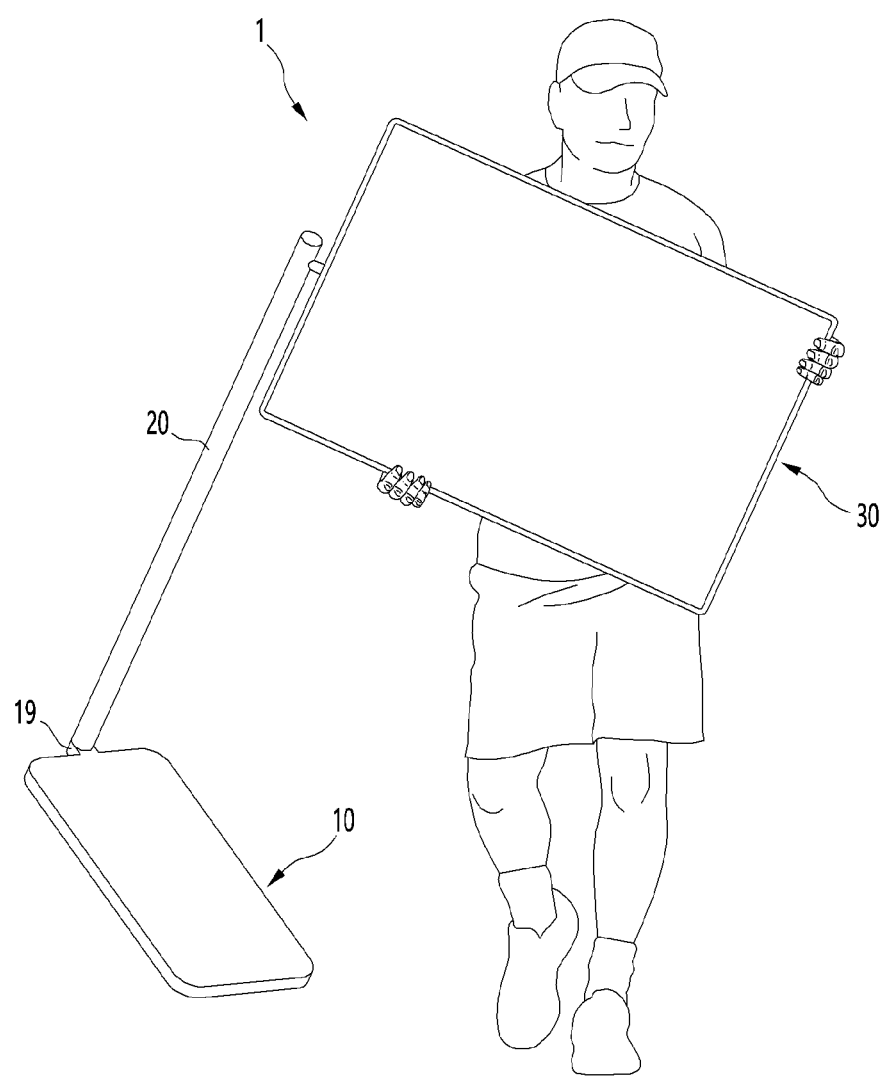
FIG. 19 is a view for describing handling of rotation lock of the display when the display device is tilted, according to an embodiment of the present disclosure.

FIG. 19 is a view for describing handling of rotation lock of the display when the display device is tilted, according to an embodiment of the present disclosure.

Referring to FIG. 19, the display device 1 may be tilted by a predetermined angle for movement.

An angle sensor or an acceleration sensor may be provided on the stand bar 20 or the base 10 of the display device 1.

The display device 1 may measure the tilt angle of the stand bar 20 or the base 10 through the angle sensor or the acceleration sensor. When the measured angle is equal to or greater than a predetermined angle, the display device 1 may maintain the rotation lock state of the display 31.

That is, the display device 1 may measure the tilt angle of the stand bar 20 or the base 10. When the measured angle is equal to or greater than a predetermined angle, the display device 1 may maintain the rotation lock state of the display 31 even when the rotation unlock condition of the display 31 is satisfied.

Accordingly, even when the display device 1 is moving, the display 31 is fixed and unnecessary rotation does not occur, so that the user can safely move the display device 1.

The above description is merely illustrative of the technical spirit of the present disclosure, and various modifications and changes can be made by those of ordinary skill in the art, without departing from the scope of the present disclosure.

Therefore, the embodiments disclosed in the present disclosure are not intended to limit the technical spirit of the present disclosure, but are intended to explain the technical spirit of the present disclosure. The scope of the technical spirit of the present disclosure is not limited by these embodiments.

The scope of the present disclosure should be interpreted by the appended claims, and all technical ideas within the scope equivalent thereto should be construed as falling within the scope of the present disclosure.

The invention claimed is:

1. A display device comprising:
   a base;
   a stand bar extending upward from the base in a vertical direction; and
   a head having a display on a front side and having a pair of long sides and a pair of short sides on a peripheral portion, the head being pivotable between a landscape mode in which the long side is in a horizontal state and a portrait mode in which the long side is in a vertical state,
   wherein the head comprises a processor configured to determine whether a rotation unlock condition of the head is satisfied, and when the rotation unlock condition of the head is satisfied, rotate the head about a rotation axis as external force is applied to the head, and
   wherein the processor is configured to determine that the rotation unlock condition of the head is satisfied when a touch input is sensed within a predetermined area of a display area of the display.

2. The display device of claim 1, wherein, when the display is in the landscape mode, the predetermined area is far away from the stand bar and is located at an upper right end of the display, and
   wherein, when the display is in the portrait mode, the predetermined area is far away from the stand bar and is located at a lower right end of the display.

3. The display device of claim 1, wherein the processor is further configured to determine that the rotation unlock condition of the head is satisfied when a user's touch is sensed in a predetermined part of the peripheral portion.

4. The display device of claim 3, wherein, when the display is in the landscape mode, the predetermined part is far away from the stand bar and is located at an upper right end of the display, and
   wherein, when the display is in the portrait mode, the predetermined part is far away from the stand bar and is located at a lower right end of the display.

5. The display device of claim 1, wherein the processor is further configured to determine that the rotation unlock condition of the head is satisfied when a touch input is sensed within a predetermined area of a display area of the display and a user's touch is sensed in a predetermined part of the peripheral portion.

6. The display device of claim 1, wherein the processor is configured to, when the rotation unlock condition of the head is satisfied, display guide information indicating that rotation of the head is possible on the display.

7. The display device of claim 1, wherein the processor is configured to, when the rotation unlock condition of the head is satisfied, display guide information indicating to hold and rotate a specific part of the head on the display.

8. The display device of claim 1, wherein, when the stand bar or the base is tilted by a predetermined angle, the processor is configured to maintain a rotation lock state of the head even when the rotation unlock condition of the head is satisfied.

9. The display device of claim 8, wherein the stand bar or the base comprises an angle sensor or an acceleration sensor configured to measure a tilt angle.

10. The display device of claim 1, further comprising:
    a through groove extending along the peripheral portion of the head;
    a connecting bar disposed inside the head and connected to the stand bar through the through groove;
    a latch protruding inward from an inner surface of the head and supported by the connecting bar; and
    an elastic member configured to press the latch in a protruding direction.

11. The display device of claim 10, further comprising a motor configured to press the latch when the rotation unlock condition of the head is satisfied.

* * * * *